US009357628B2

(12) United States Patent
Conway et al.

(10) Patent No.: US 9,357,628 B2
(45) Date of Patent: May 31, 2016

(54) PLASMA CUTTING TIP WITH ADVANCED COOLING PASSAGEWAYS

(71) Applicant: VICTOR EQUIPMENT COMPANY, Denton, TX (US)

(72) Inventors: Christopher J. Conway, Wilmot, NH (US); Daniel Wayne Barnett, Plainfield, NH (US); Nakhleh Hussary, Grantham, NH (US)

(73) Assignee: Victor Equipment Company, Denton, TX (US)

( * ) Notice: Subject to any disclaimer, the term of this patent is extended or adjusted under 35 U.S.C. 154(b) by 0 days.

(21) Appl. No.: 14/816,289

(22) Filed: Aug. 3, 2015

(65) Prior Publication Data

US 2015/0342018 A1 Nov. 26, 2015

Related U.S. Application Data

(63) Continuation of application No. 13/407,396, filed on Feb. 28, 2012, now Pat. No. 9,131,596.

(60) Provisional application No. 61/447,560, filed on Feb. 28, 2011.

(51) Int. Cl.
*B23K 10/00* (2006.01)
*H05H 1/34* (2006.01)
*H05H 1/28* (2006.01)

(52) U.S. Cl.
CPC . *H05H 1/34* (2013.01); *H05H 1/28* (2013.01); *H05H 2001/3442* (2013.01); *Y10T 29/49002* (2015.01); *Y10T 29/49117* (2015.01); *Y10T 29/49204* (2015.01); *Y10T 29/49218* (2015.01); *Y10T 29/49222* (2015.01)

(58) Field of Classification Search
CPC ... H05H 1/28; H05H 1/34; H05H 2001/3442; H05H 1/26
USPC ......... 219/121.49, 121.5, 121.55, 121.48, 75, 219/121.59; 313/231.41
See application file for complete search history.

(56) References Cited

U.S. PATENT DOCUMENTS 5,620,616 A * 4/1997 Anderson ................ H05H 1/28 219/119
5,897,795 A * 4/1999 Lu ............................ H05H 1/34 219/121.5
8,389,887 B2 * 3/2013 Liebold .................. B23K 9/296 219/121.49
2005/0082263 A1 * 4/2005 Koike ...................... H05H 1/28 219/121.49
2012/0012560 A1 * 1/2012 Roberts .................... H05H 1/34 219/74

* cited by examiner

*Primary Examiner* — Mark Paschall
(74) *Attorney, Agent, or Firm* — Kacvinsky Daisak Bluni PLLC

(57) ABSTRACT

A plasma arc torch is provided that includes a tip having an improved life. The tip defines a first set of fluid passageways, a second set of fluid passageways and an internal cavity in fluid communication with the first and second fluid passageways. The internal cavity includes a base portion disposed proximate and surrounding a central orifice of the tip. A first set of fluid passageways allow for entry of a cooling fluid into the tip and a second set of fluid passageways allow for exit of the cooling fluid from the tip.

20 Claims, 24 Drawing Sheets

PLASMA CUTTING TIP WITH ADVANCED COOLING PASSAGEWAYS

CROSS-REFERENCE TO RELATED APPLICATIONS

The present application is a continuation of pending U.S. patent application Ser. No. 13/407,396 filed Feb. 28, 2012, which is a non-provisional of U.S. Provisional Ser. No. 61/447,560, filed Feb. 28, 2011. The entirety of the above applications are incorporated herein by reference.

FIELD

The present disclosure relates to plasma arc torches and more specifically to tips for use in plasma arc torches.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a “transferred arc” mode.

The consumables of the plasma arc torch, such as the electrode and the tip, are susceptible to wear due to high current/power and high operating temperatures. After the pilot arc is initiated and the plasma stream is generated, the electrode and the tip are subjected to high heat and wear from the plasma stream throughout the entire operation of the plasma arc torch. Improved consumables and methods of operating a plasma arc torch to increase consumables life, thus increasing operating times and reducing costs, are continually desired in the art of plasma cutting.

SUMMARY

In one form of the present disclosure, a tip for a plasma arc torch includes a proximal portion and a tapered distal portion. The proximal portion is adapted for connection to an adjacent anode member of the plasma arc torch. The proximal portion defines a first set of fluid passageways for entry of a cooling fluid into the tip and a second set of fluid passageways for exit of the cooling fluid from the tip. The tapered distal portion extends from the proximal portion to an exit orifice of the tip. The tapered distal portion defines an internal cavity in fluid communication with the first set of fluid passageways and the second set of fluid passageways. A base portion of the internal cavity surrounds the exit orifice.

In another form of the present disclosure, a tip for a plasma arc torch includes a central member adapted for connection to an adjacent anode member of the plasma arc torch, and an outer member disposed around the central member. The central member defines a first fluid passageway for entry of a cooling fluid into the tip and an exit orifice. The outer member defines a second fluid passageway for exit of the cooling fluid from the tip.

In still another form, a tip for a plasma arc torch includes a central member adapted for connection to an adjacent anode member of the plasma arc torch and an outer member disposed around the central member. The central member defines a first set of fluid passageways for entry of a cooling fluid into the tip, a tapered distal end portion having an outer peripheral wall section, and an exit orifice. The outer member defines a second set of fluid passageways for exit of the cooling fluid from the tip and an inner peripheral wall section. The outer peripheral wall section of the central member and the inner peripheral wall section of the outer member define an internal cavity in fluid communication with the first set of fluid passageways and the second set of fluid passageways. A base portion of the internal cavity surrounds the exit orifice.

In still another form, a tip for a plasma arc torch includes a proximal portion adapted for connection to an adjacent anode member of the plasma arc torch, and a distal portion extending from the proximal portion to an exit orifice of the tip. The distal portion defines an internal cavity configured for entry and exit of a cooling fluid into and out of the tip. A base portion of the internal cavity surrounds the exit orifice.

In still another form, a plasma arc torch includes a cathode member, an electrode electrically connected to the cathode member, a tip, and a cap member surrounding the tip to define a secondary gas chamber between the tip and the cap member. The secondary gas chamber allows a secondary gas to flow through. The tip includes a proximal portion adapted for connection to an adjacent anode member and a distal portion extending from the proximal portion to an exit orifice of the tip. The distal portion defines an internal cavity configured for entry and exit of a cooling fluid into and out of the tip. A base portion of the internal cavity surrounds the exit orifice. The internal cavity is disposed between the exit orifice and the secondary gas chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
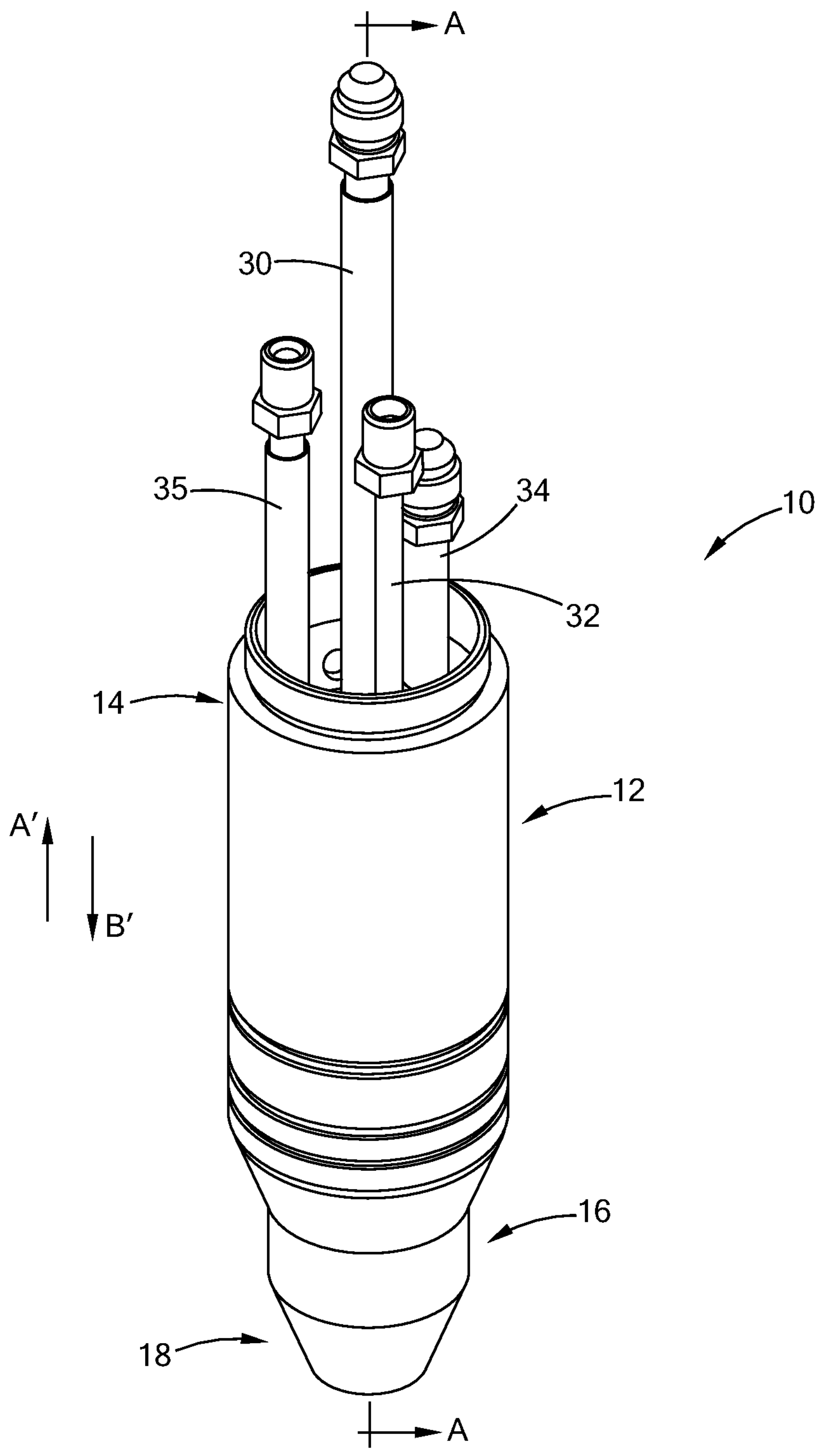
FIG. 1 is a perspective view of a plasma arc torch constructed in accordance with the principles of the present disclosure.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 2:
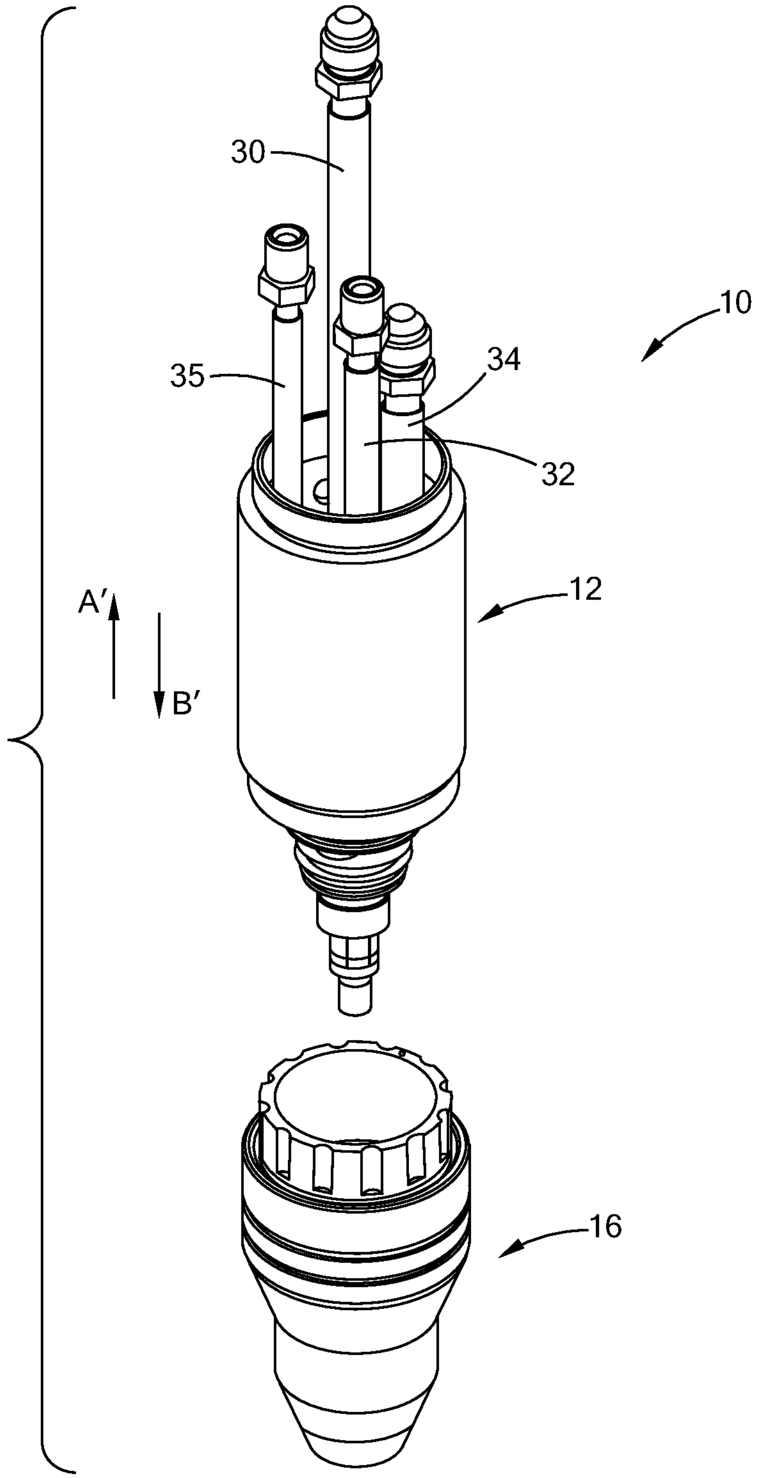
FIG. 2 is an exploded perspective view of a plasma arc torch constructed in accordance with the principles of the present disclosure.
Figure 3:
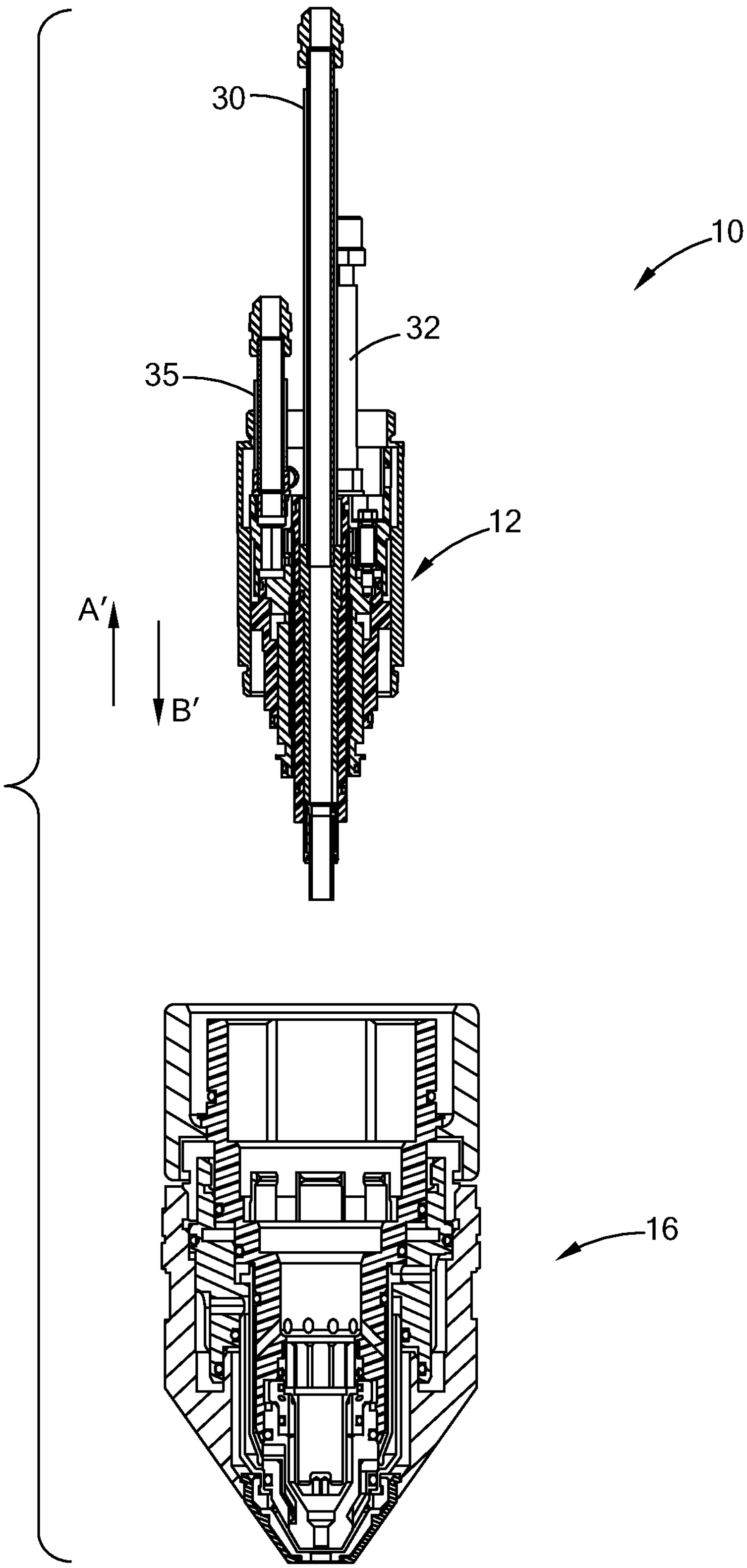
FIG. 3 is an exploded, cross-sectional view of a plasma arc torch, taken along line A-A of FIG. 1 and constructed in accordance with the principles of the present disclosure.

Referring to the drawings, a plasma arc torch according to the present disclosure is illustrated and indicated by reference numeral 10 in FIG. 1 through FIG. 3. The plasma arc torch 10 generally comprises a torch head 12 disposed at a proximal end 14 of the plasma arc torch 10 and a consumables cartridge 16 secured to the torch head 12 and disposed at a distal end 18 of the plasma arc torch 10 as shown.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, proximal direction or proximally is the direction towards the torch head 12 from the consumable cartridge 16 as depicted by arrow A', and distal direction or distally is the direction towards the consumable components 16 from the torch head 12 as depicted by arrow B'.

Figure 4:
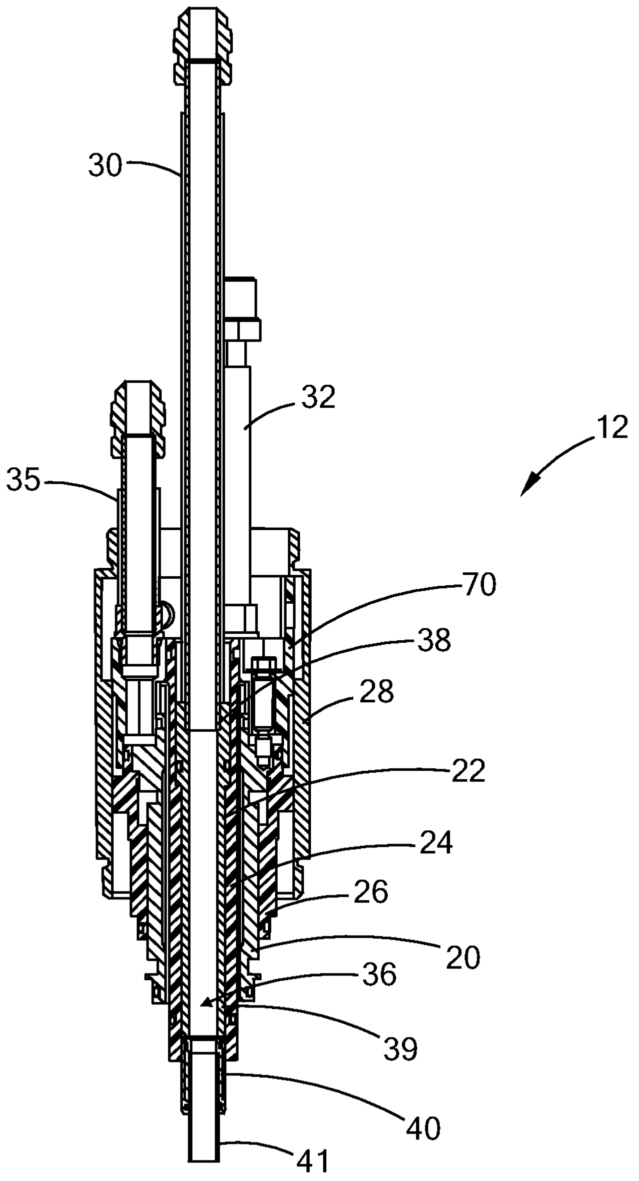
FIG. 4 is a cross-sectional view of a torch head of the plasma arc torch of FIG. 3.

Referring more specifically to FIG. 4, the torch head 12 includes an anode body 20, a cathode 22, a central insulator 24 that insulates the cathode 22 from the anode body 20, an outer insulator 26, and a housing 28. The outer insulator 26 surrounds the anode body 20 and insulates the anode body 20 from the housing 28. The housing 28 encapsulates and protects the torch head 12 and its components from the surrounding environment during operation. The torch head 12 is further adjoined with a coolant supply tube 30, a plasma gas tube 32, a coolant return tube 34 (shown in FIGS. 1 and 2), and a secondary gas tube 35, wherein plasma gas and secondary gas are supplied to and cooling fluid is supplied to and returned from the plasma arc torch 10 during operation as described in greater detail below.

The central insulator 24 defines a cylindrical tube that houses the cathode 22 as shown. The central insulator 24 is further disposed within the anode body 20 and also engages a torch cap 70 that accommodates the coolant supply tube 30, the plasma gas tube 32, and the coolant return tube 34.

The anode body 20 is in electrical communication with the positive side of a power supply (not shown) and the cathode 22 is in electrical communication with the negative side of the power supply. The cathode 22 defines a cylindrical tube having a proximal end 38, a distal end 39, and a central bore 36 extending between the proximal end 38 and the distal end 39. The bore 36 is in fluid communication with the coolant supply tube 30 at the proximal end 38 and a coolant tube assembly 41 at the distal end 39. The cooling fluid flows from the coolant supply tube 30 to the central bore 36 of the cathode 22 and is then distributed through the coolant tube assembly 41 to the consumable components of the consumable cartridge 16. A cathode cap 40 is attached to the distal end 39 of the cathode 22 to protect the cathode 22 from damage during replacement of the consumable components or other repairs. The torch head 12 of the plasma arc torch has been disclosed in U.S. Pat. No. 6,989,505, the contents of which are incorporated by reference in its entirety.

Figure 5:
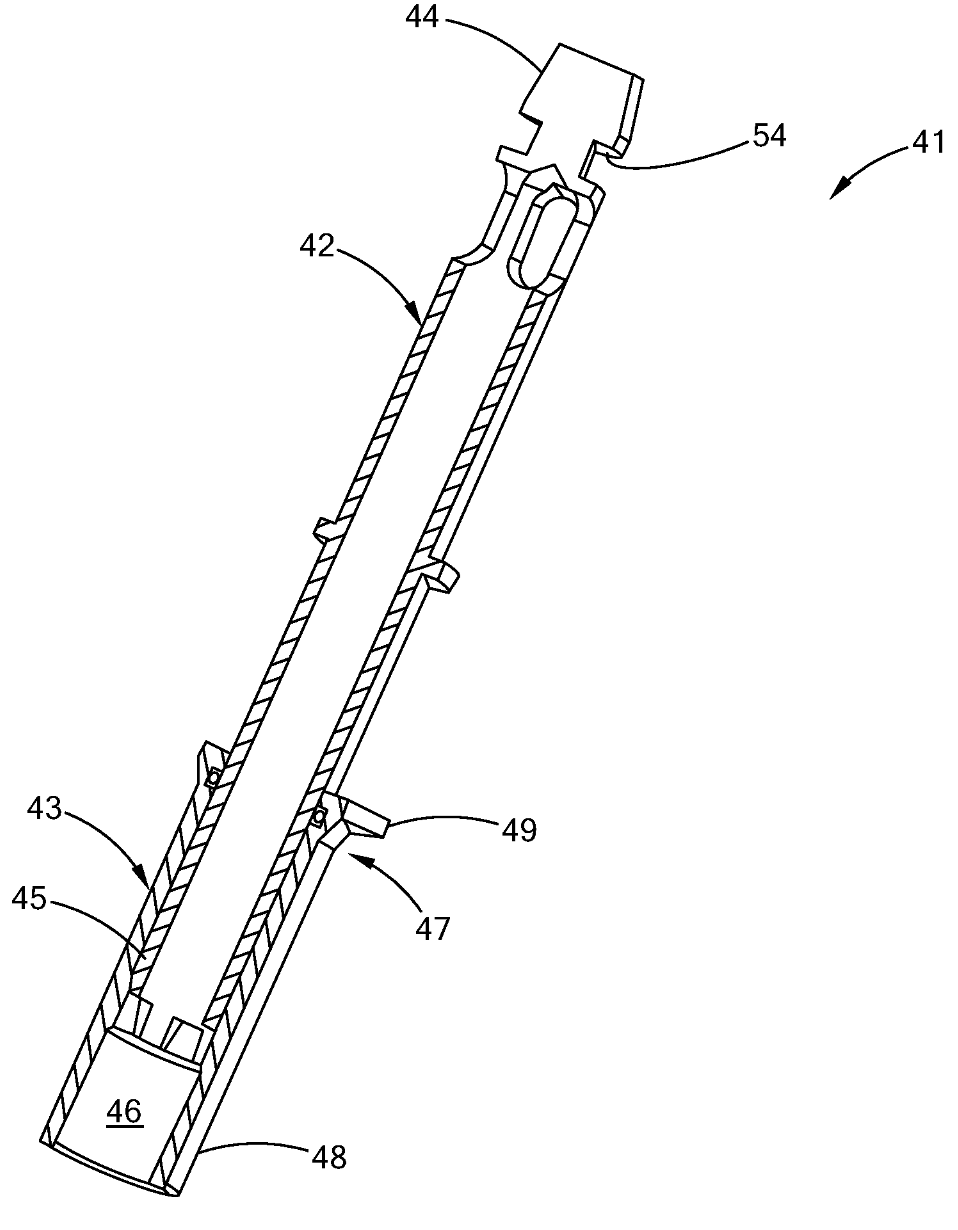
FIG. 5 is a perspective, cross-sectional view of a coolant tube assembly of the torch head of FIG. 4.

Referring to FIG. 5, the coolant tube assembly 41 includes a coolant tube 42 and a tubular member 43 surrounding the coolant tube 42. The coolant tube 42 includes a proximal end 44 disposed within the cathode 32 and a distal end 45 disposed within the tubular member 43. The proximal end 44 defines an o-ring groove 54 in which an o-ring (not shown) is inserted to seal the interface between the proximal end 44 of the coolant tube 42 and the cathode cap 40. The tubular member 43 defines a cavity 46 extending from a proximal end 47 to a distal end 48.

Figure 6:
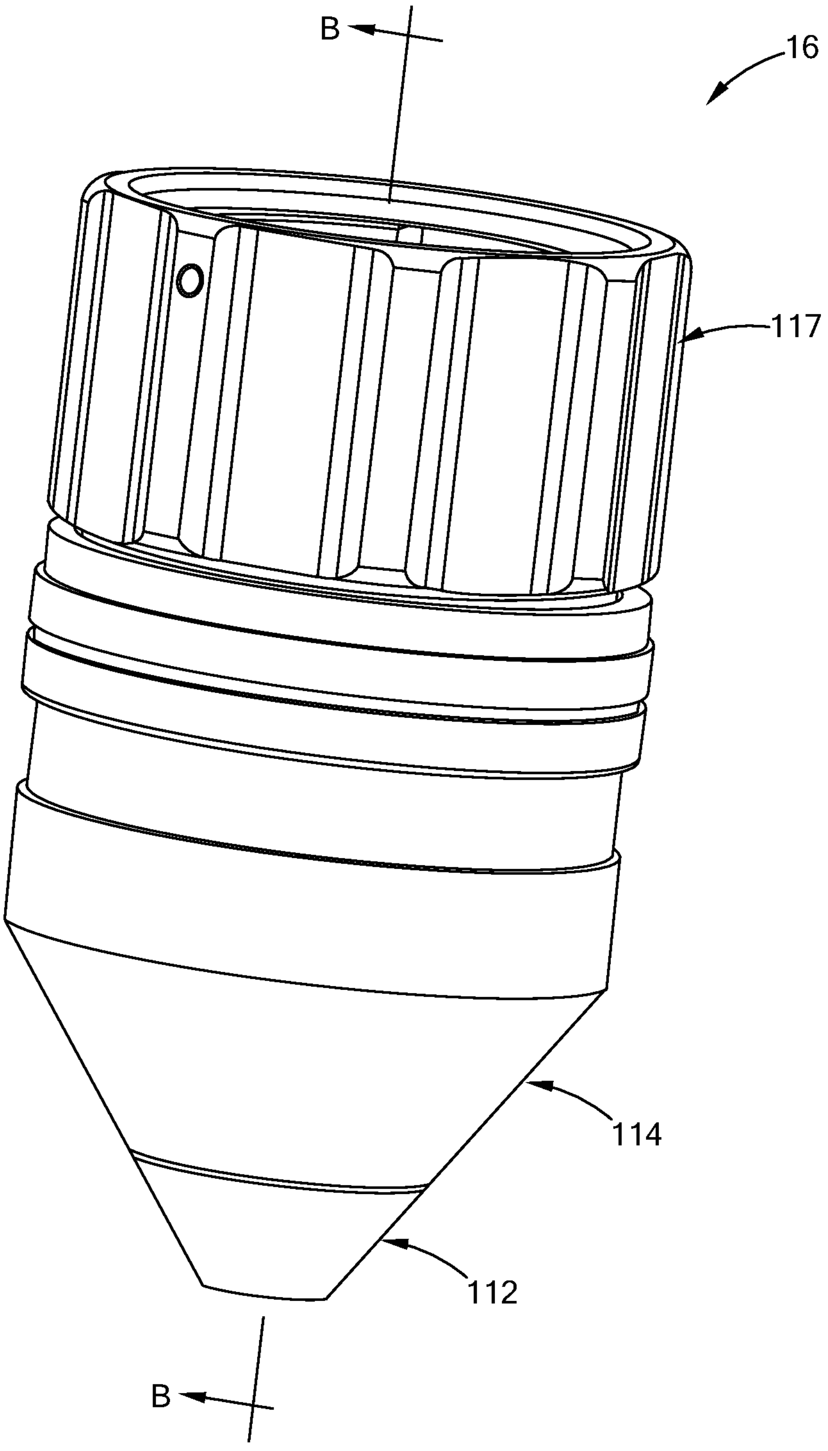
FIG. 6 is a perspective view of a consumable cartridge of a plasma arc torch constructed in accordance with the principles of the present disclosure.
Figure 7:
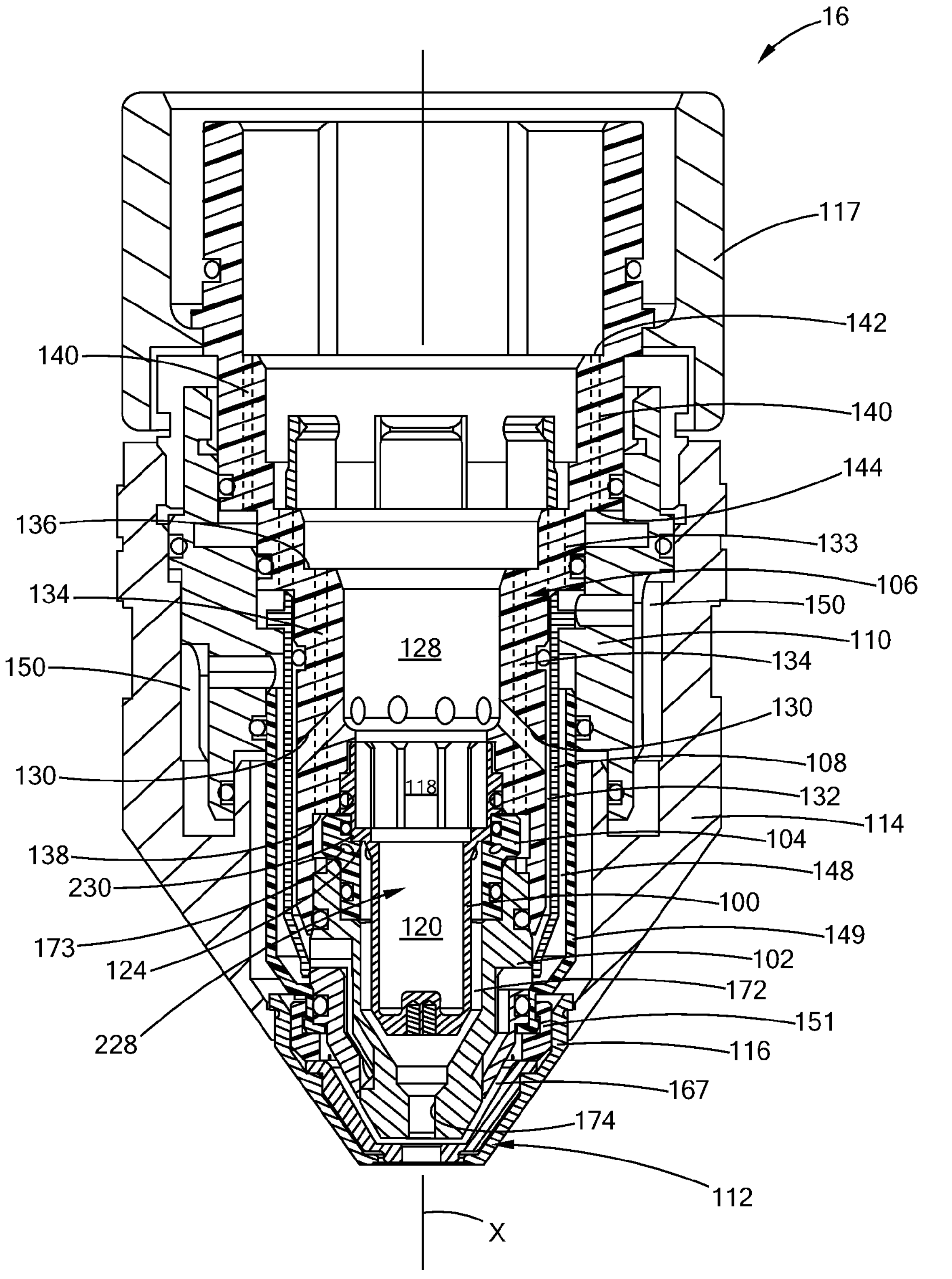
FIG. 7 is a cross-sectional view, taken along line B-B of FIG. 6, of the consumable cartridge in accordance with the principles of the present disclosure.

Referring to FIGS. 6 and 7, the consumable cartridge 16 includes a plurality of consumables including an electrode 100, a tip 102, a spacer 104 disposed between the electrode 100 and the tip 102, a cartridge body 106, an anode member 108, a baffle 110, a secondary cap 112, and a shield cap 114. The anode member 108 connects the anode body 20 (shown in FIG. 4) in the torch head 20 to the tip 102 to provide electrical continuity from the power supply (not shown) to the tip 102. The anode member 108 is secured to the cartridge body 106. The spacer 104 provides electrical separation between the cathodic electrode 100 and the anodic tip 102, and further provides certain gas distributing functions as described in greater detail below. The shield cap 114 surrounds the baffle 110 as shown, wherein a secondary gas passage 150 is formed therebetween. The secondary cap 112 and the tip 102 define a secondary gas chamber 167 therebetween. The secondary gas chamber 167 allows a secondary gas to flow through to cool the tip 102 during operation.

As further shown, the consumable cartridge 16 further includes a locking ring 117 to secure the consumable cartridge 16 to the torch head 12 (shown in FIG. 4) when the plasma arc torch 10 is fully assembled. The consumable cartridge 16 further include a secondary spacer 116 that separates the secondary cap 112 from the tip 102 and a retaining cap 149 that surrounds the anode member 108. The secondary cap 112 and the secondary spacer 116 are secured to a distal end 151 of the retaining cap 149.

The tip 102 is electrically separated from the electrode 100 by the spacer 104, which results in a plasma chamber 172 being formed between the electrode 100 and the tip 102. The tip 102 further comprises a central orifice (or an exit orifice) 174, through which a plasma stream exits during operation of the plasma arc torch 10 as the plasma gas is ionized within the plasma chamber 172. The plasma gas enters the tip 102 through the gas passageway 173 of the spacer 104.

Figure 8:
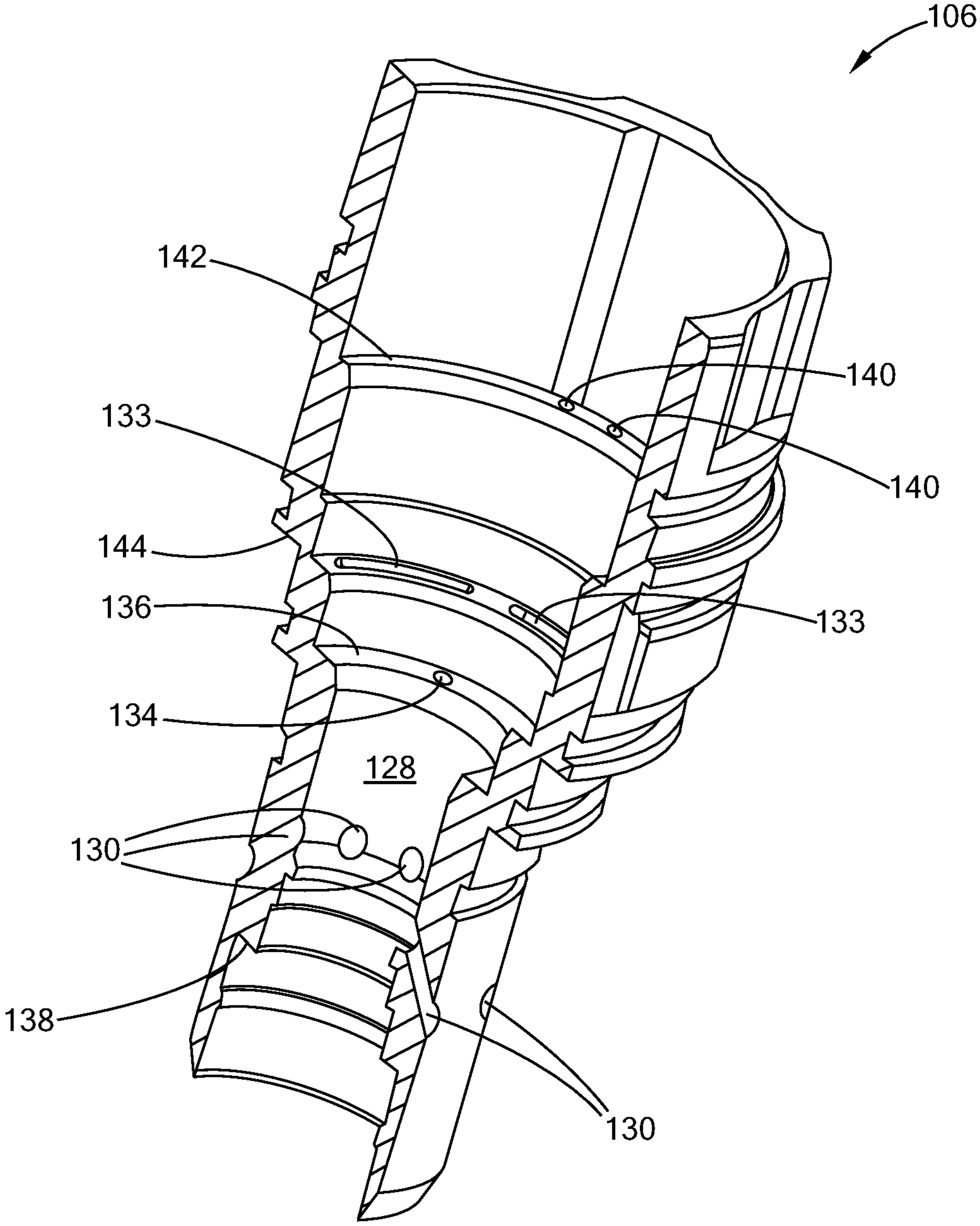
FIG. 8 is a perspective, cross-sectional view of a cartridge body of a plasma arc torch constructed in accordance with the principles of the present disclosure.

Referring to FIGS. 7 and 8, the cartridge body 106 generally houses and positions the other consumable components 16 and also distributes plasma gas, secondary gas, and cooling fluid during operation of the plasma arc torch 10. In addition to positioning the various consumable components 16, the cartridge body 106 made of an insulative material, also separates anodic member (e.g., the anode member 108) from cathodic members (e.g., electrode 100).

For the distribution of cooling fluid, the cartridge body 106 defines an upper chamber 128 and a plurality of passageways 130 that extend through the cartridge body 106 and into an inner cooling chamber 132 formed between the cartridge body 106 and the anode member 108. The passageways 130 are shown to be angled radially outward in the distal direction from the upper chamber 128 to reduce any amount of dielectric creep that may occur between the electrode 100 and the anode member 108. Additionally, outer axial passageways 133 (shown in dashed lines in FIG. 7) are formed in the cartridge body 106 that provide for a return of the cooling fluid, which is further described below. Near the distal end of the consumables cartridge 16, an outer fluid passage 148 is formed between the anode member 108 and a retaining cap 149 for the return of cooling fluid as described in greater detail below.

For the distribution of plasma gas, the cartridge body 106 defines a plurality of distal axial passageways 134 that extend from a proximal face 136 of the cartridge body 106 to a distal end 138 thereof, which are in fluid communication with the plasma gas tube 32 (not shown) and passageways 173 formed in the spacer 104, which direct the plasma gas to the plasma chamber 172 defined between the electrode 100 and the tip 102. Additionally, a plurality of proximal axial passageways 140 (shown in dashed lines in FIG. 7) are formed through the cartridge body 106 that extend from a recessed proximal face 142 to a distal outer face 144 for the distribution of a secondary gas. Accordingly, the cartridge body 106 performs both cooling fluid distribution functions in addition to plasma gas and secondary gas distribution functions.

Figure 9:
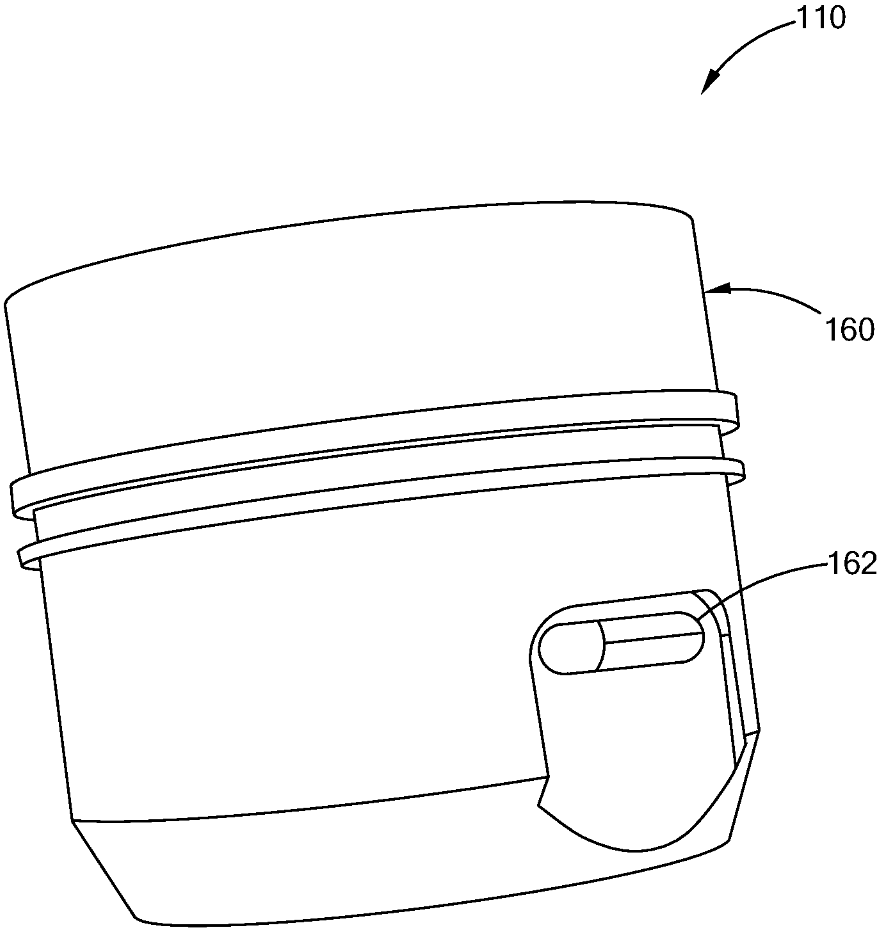
FIG. 9 is a perspective view of a baffle of a plasma arc torch constructed in accordance with the principles of the present disclosure.
Figure 10:
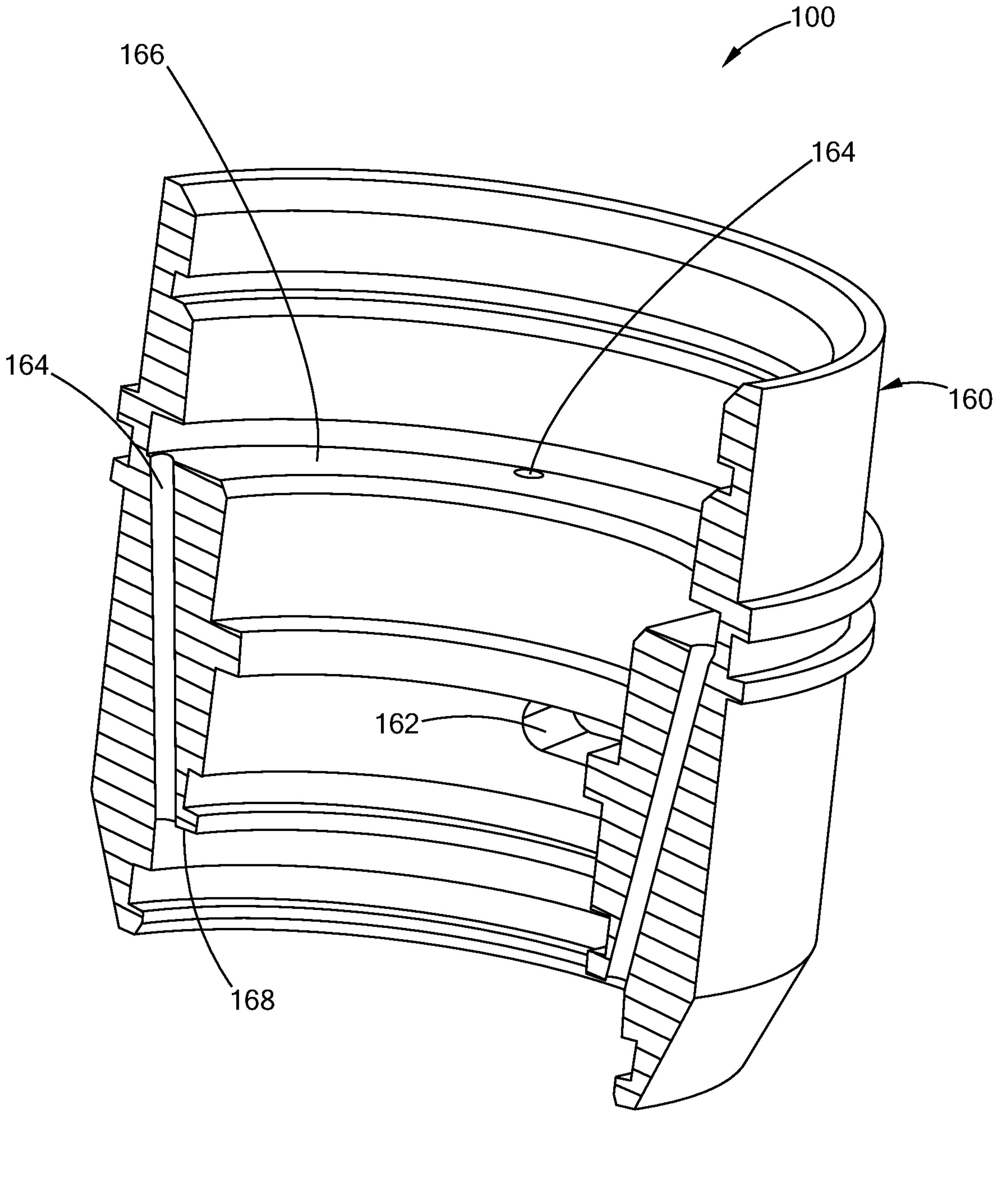
FIG. 10 is a perspective, cross-sectional view of the baffle of FIG. 9.

Referring to FIGS. 7, 9 and 10, a baffle 110 includes a substantially cylindrical body 160 is disposed between the cartridge body 106 and the shield cap 114 for directing cooling fluid. The baffle 110 defines radial passageways 162 and a plurality of axial passageways 164 extending from a proximal surface 166 and a distal surface 168 for guiding the cooling fluid.

Figure 11:
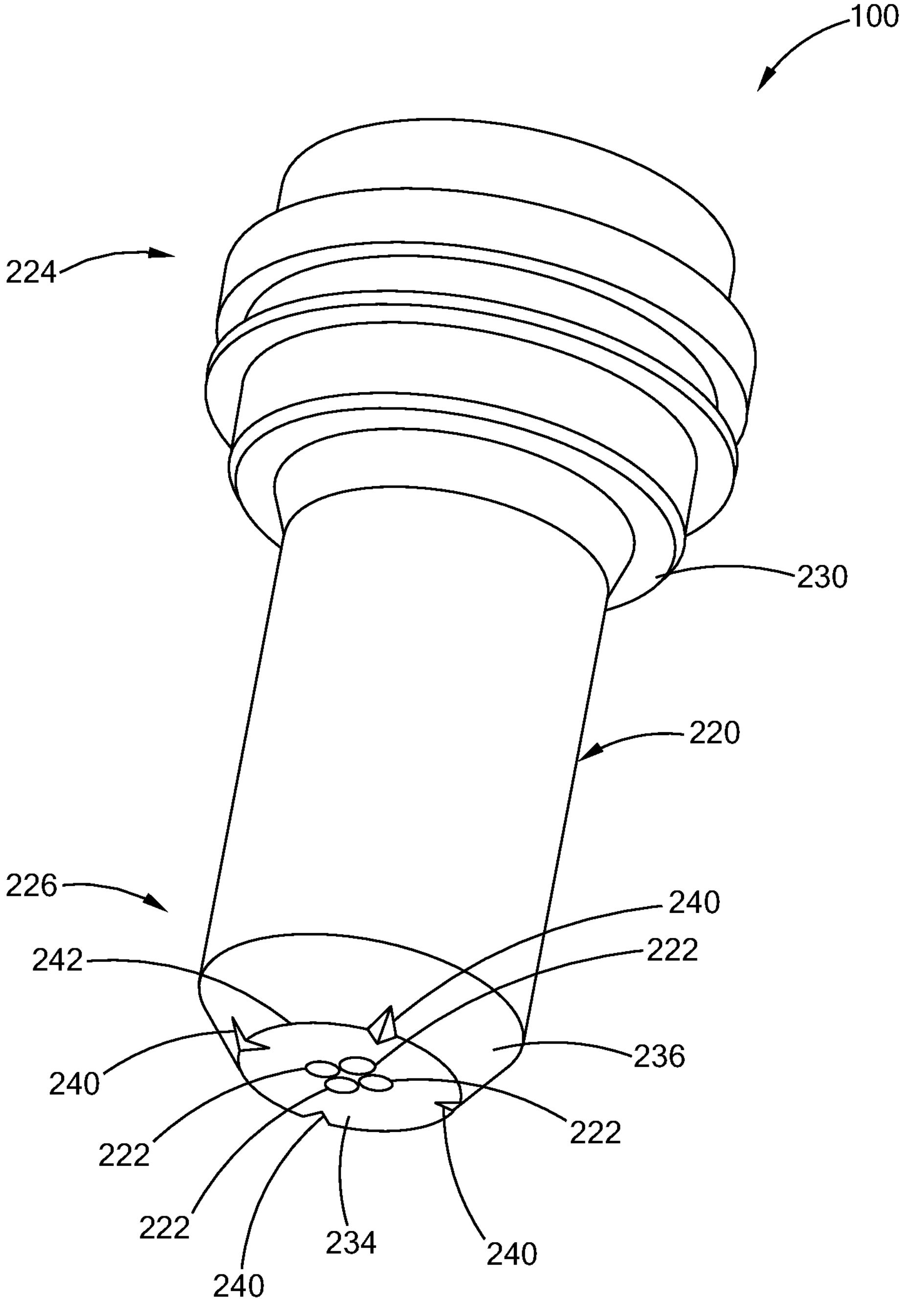
FIG. 11 is a perspective view of an electrode constructed in accordance with the principles of the present disclosure.
Figure 12:
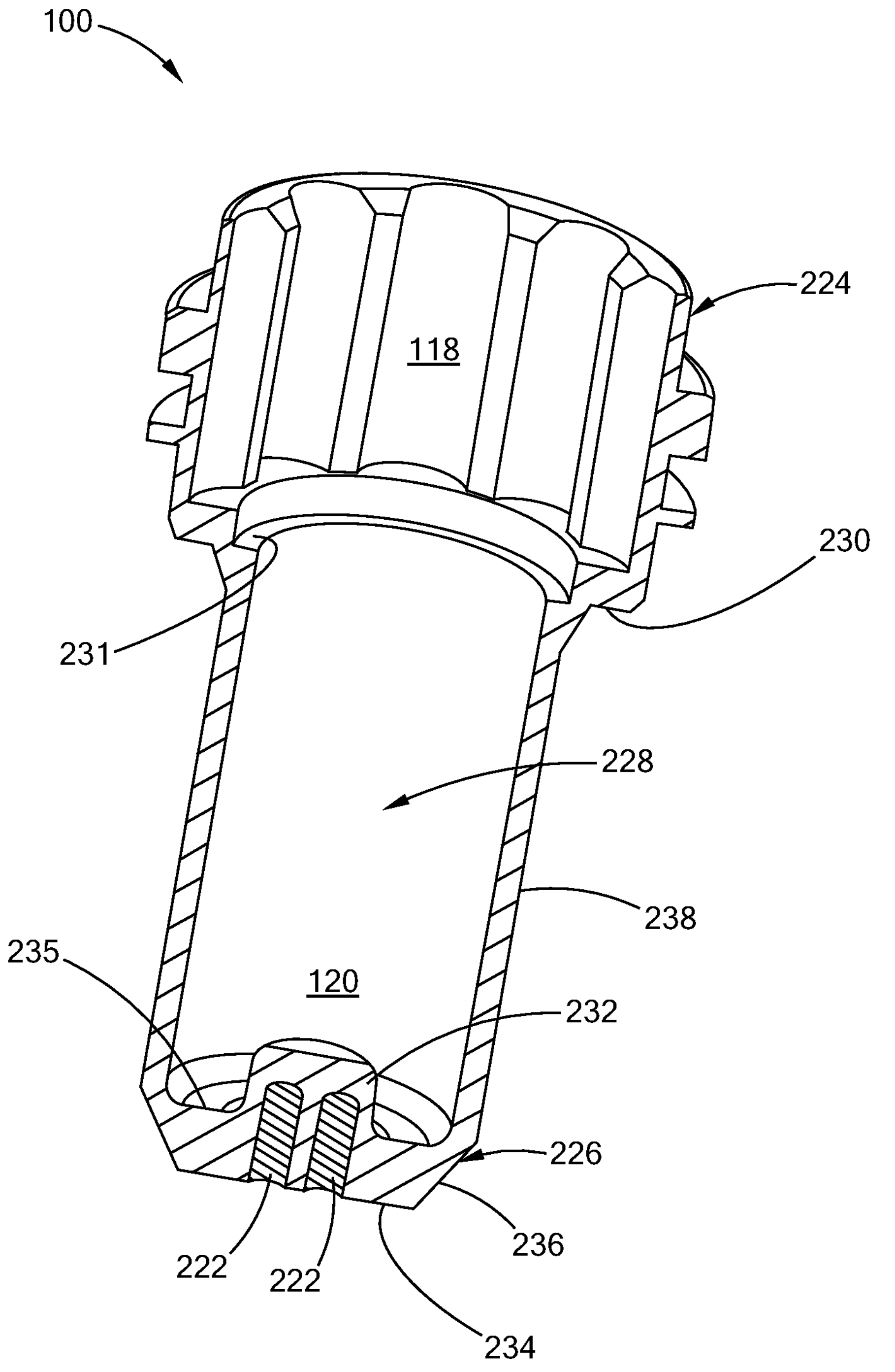
FIG. 12 is a perspective, cross-sectional view of an electrode constructed in accordance with the principles of the present disclosure.

Referring to FIGS. 7, 11 and 12, the electrode 100 includes a conductive body 220 and a plurality of emissive inserts 222. The conductive body 200 includes a proximal end portion 224 and a distal end portion 226 and defines a central cavity 228 extending through the proximal end portion 224 and in fluid communication with the coolant tube assembly 41 (shown in FIG. 4). The central cavity 228 includes a distal cavity 120 and a proximal cavity 118.

The proximal end portion 222 includes an external shoulder 230 that abuts against the spacer 104 for proper positioning along the central longitudinal axis X of the plasma arc torch 10. The spacer 104 includes an internal annular ring 124 (shown in FIG. 7) that abuts the external shoulder 230 of the electrode 100 for proper positioning of the electrode 100 along the central longitudinal axis X of the plasma arc torch 10.

The electrode 100 further includes a central protrusion 232 disposed within the central cavity 228 and at the distal end portion 226. When the consumable cartridge 16 is mounted to the torch head 12, the central protrusion 232 is received within the central cavity 46 of the tubular member 43 of the coolant tube assembly 41 so that the cooling fluid from the central bore 36 of the cathode 32 is directed to the coolant tube assembly 41 and enters the central cavity 228 of the electrode 100. The central cavity 228 of the electrode 100 is thus exposed to a cooling fluid during operation of the plasma arc torch 10.

The distal end portion 226 further includes a distal end face 234 and an angled sidewall 236 extending from the distal end face 234 to a cylindrical sidewall 238 of the conductive body 220. The plurality of emissive inserts 222 are disposed at the distal end portion 226 and extend through the distal end face 234 into the central protrusion 232 and not into the central cavity 228. The plurality of emissive inserts 222 are concentrically nested about the centerline of the conductive body 220. The emissive inserts 222 may have the same or different diameters and may be arranged to overlap or be spaced apart. A plurality of notches 240 may be provided and extend into the angled sidewall 236 and the distal end face 234 as shown.

Figure 13:
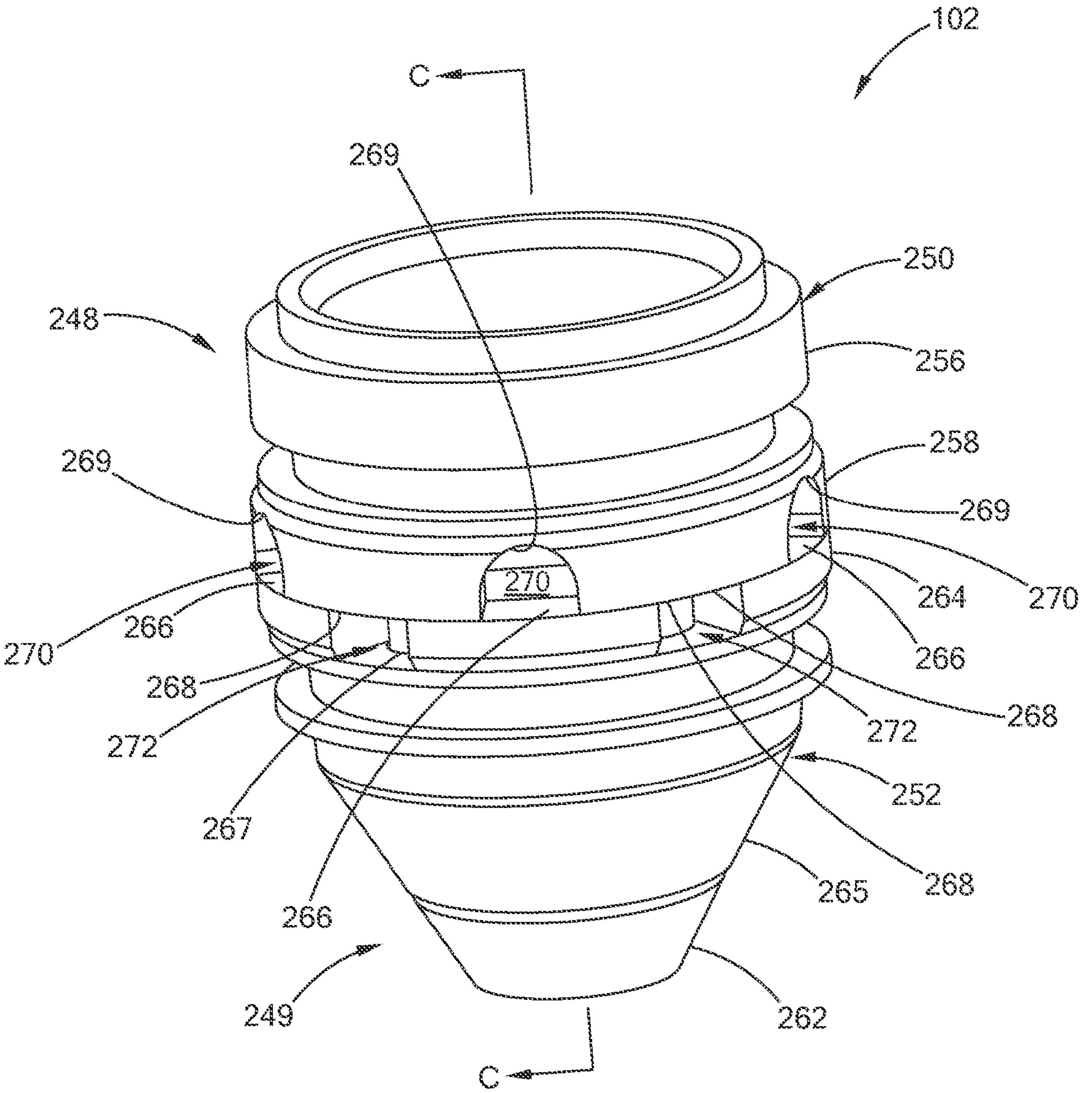
FIG. 13 is a perspective view of a tip constructed in accordance with the principles of the present disclosure.
Figure 14:
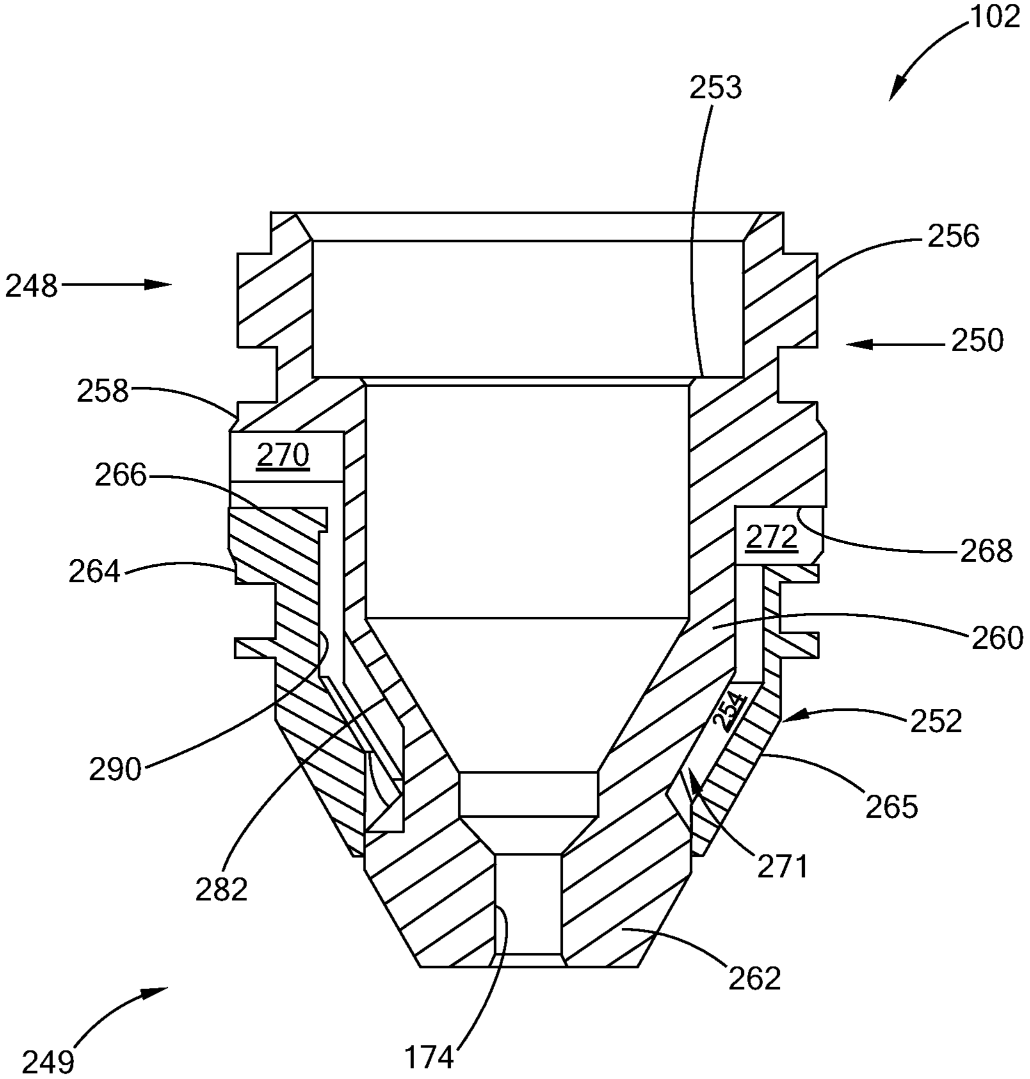
FIG. 14 is a cross-sectional view of a tip, taken along line C-C of FIG. 13.

Referring to FIGS. 13 and 14, the tip 102 includes a proximal portion 248 adapted for connection to an adjacent anode member of the plasma arc torch 10 and a distal portion 249 having a substantially tapered shape. The tip 102 in the exemplary embodiment has a two-piece structure and includes a central member 250 extending from the proximal portion 248 to the distal portion 249, and an outer member 252 disposed at the distal portion 249. The outer member 252 surrounds the central member 250 to define an internal cavity 254 therebetween. The central member 250 includes a seat portion 256, a first annular flange 258, a tapered wall 260, and an orifice portion 262.

The central member 250 and the outer member 252 of the tip 102 may be joined, by way of example, by brazing, soldering, conductive adhesive (for example, a thermally conductive epoxy), press-fit, non-conductive adhesive, or welding (for example, friction stir welding). These methods are merely exemplary and thus should not be construed as limiting the scope of the present disclosure. It should also be understood that a unitized, single-piece structure may be provided as an alternative to the two-piece structure as illustrated and described herein. Moreover, a three-piece structure (set forth in greater detail below) may also be employed, in addition to more than three pieces, while remaining within the scope of the present disclosure.

As clearly shown in FIG. 14, the seat portion 256 of the central member 250 defines an internal annular ring 253 for receiving a distal portion of the spacer 104. The orifice portion 262 of the central member 250 defines the central orifice 174 of the tip 102. The first annular flange 258 includes a distal surface 268 and defines a plurality of cutout portions 269.

The outer member 252 includes a second annular flange 264 and a tapered wall 265 surrounding the tapered wall 260 of the central member 250. The second annular flange 264 includes a proximal surface 266 and defines a plurality of cutout portions 267. The distal surface 268 of the first annular flange 258 contacts the proximal surface 266 of the second annular flange 264 to define a first set of fluid passageways 270 and a second set of fluid passageways 272. The first set of fluid passageways 270 are defined by the plurality of cutout portions 269 of the first annular flange 258 and the proximal surface 266 of the second annular flange 264. The second set of fluid passageways 272 are defined by the plurality of cutout portions 267 and the distal surface 268 of the first annular flange 258.

The internal cavity 254 is in fluid communication with the first set of passageways 270 and the second set of passageways 272 and is configured for entry and exit of a cooling fluid into and out of the tip 102. The internal cavity 254 extends from the proximal portion 248 to the orifice portion 262 and defines a base portion 271 proximate and surrounding the central orifice 174. The first set of fluid passageways 270 allow the cooling fluid to enter the tip 102 to cool the tip 102. The second set of fluid passageways 272 allow the cooling fluid to exit the tip 102 after cooling.

Figure 15:
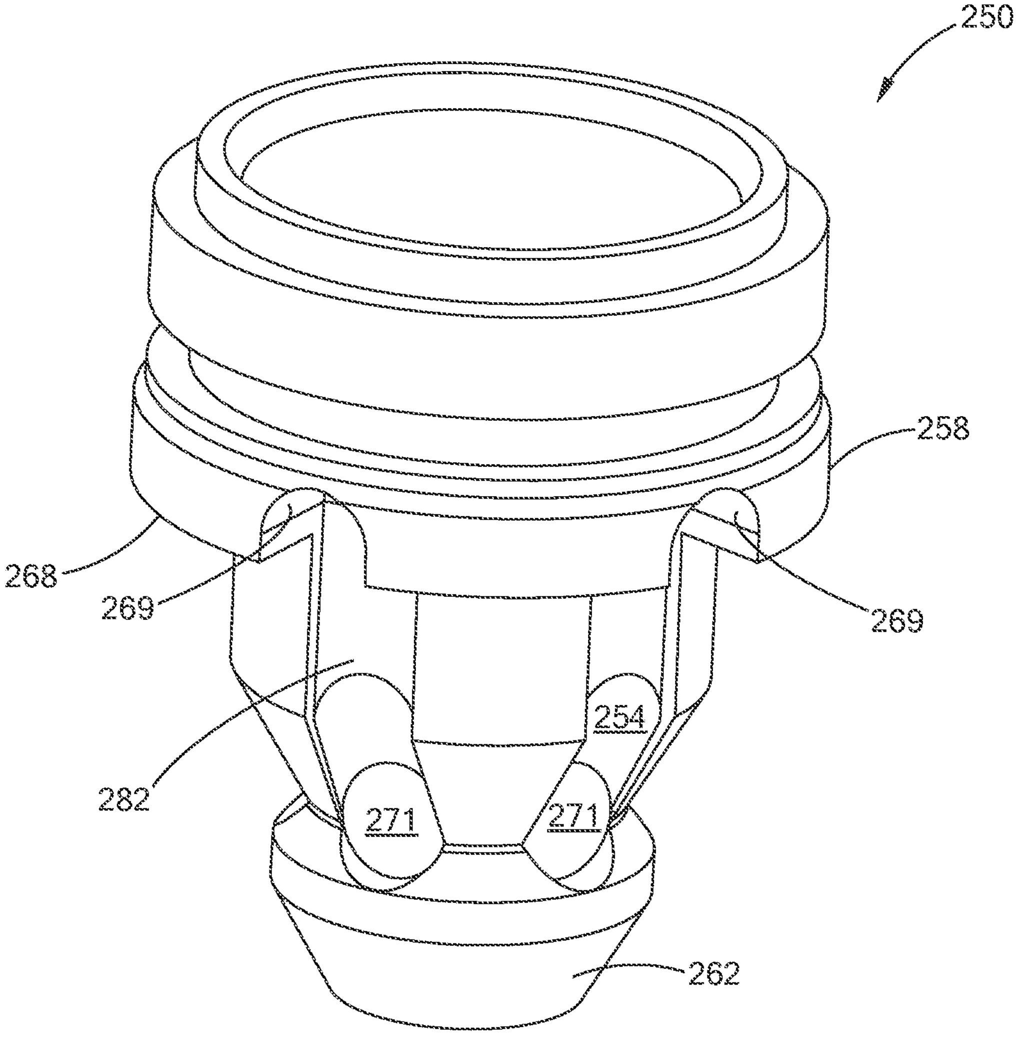
FIG. 15 is a perspective view of a central member of a tip of FIG. 13.
Figure 16:
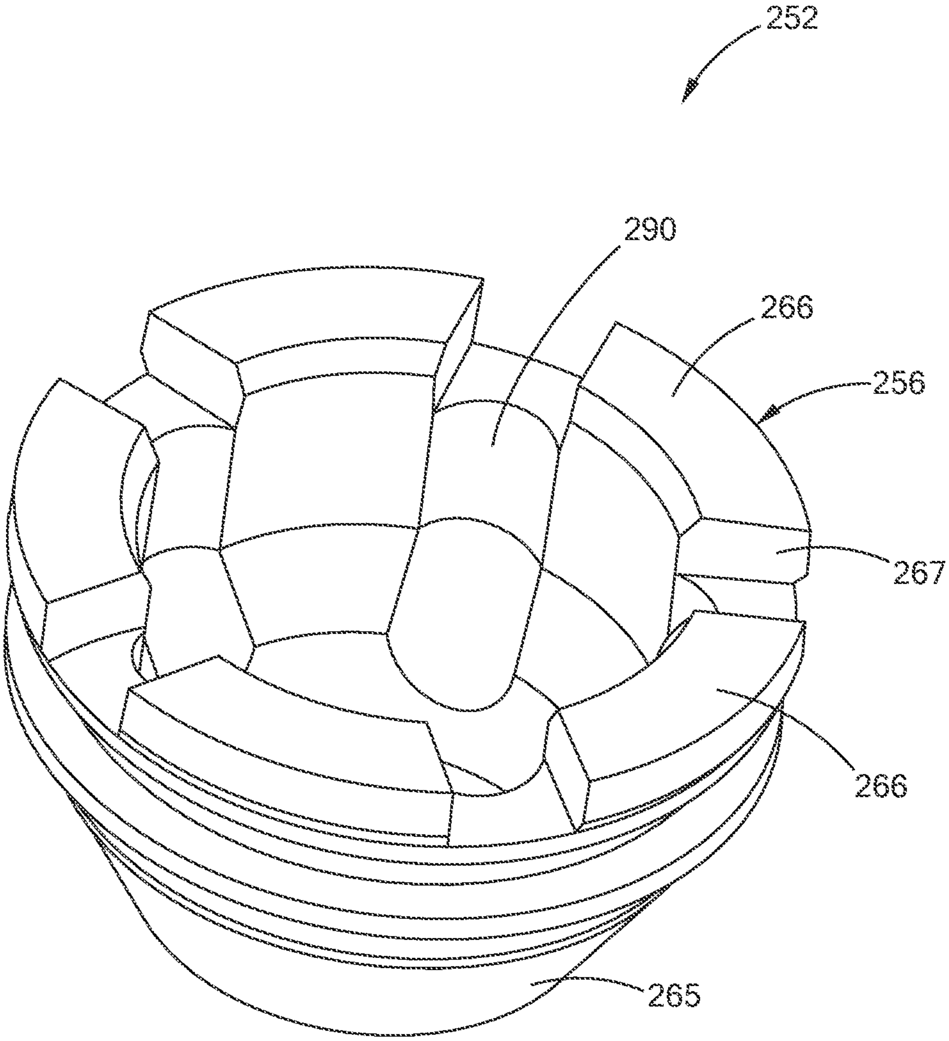
FIG. 16 is a perspective view of an outer member of a tip of FIG. 13.

Referring to FIGS. 15 and 16, the central member 250 includes an outer peripheral wall section 282. The outer member 252 defines an inner peripheral wall section 290 opposing the outer peripheral wall section 282 to define the internal cavity 254 therebetween. The internal cavity 254 extends from the proximal portion 248 to the orifice portion 262.

Figure 17:
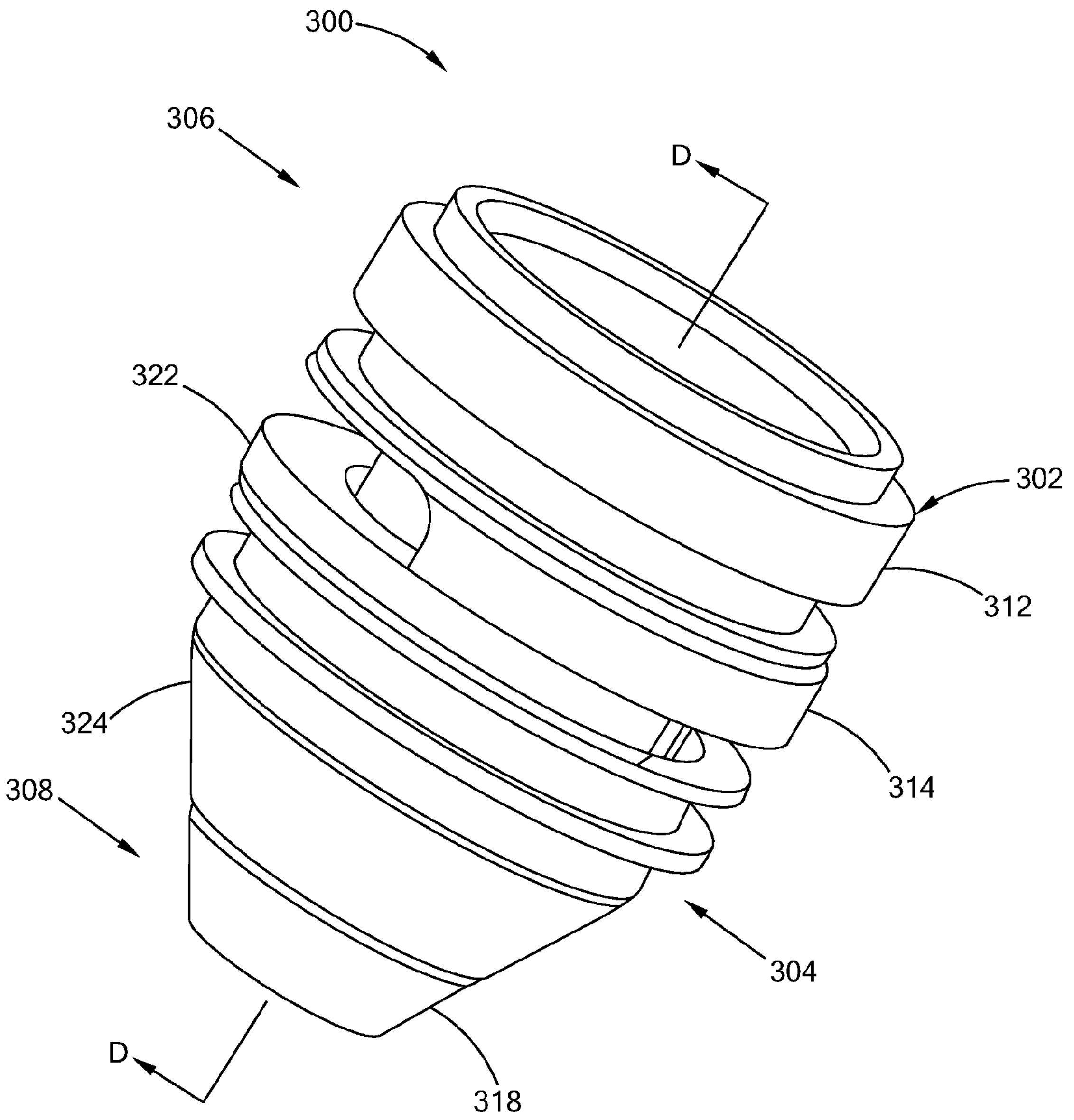
FIG. 17 is a perspective view of an alternate form of a tip constructed in accordance with the principles of the present disclosure.
Figure 18:
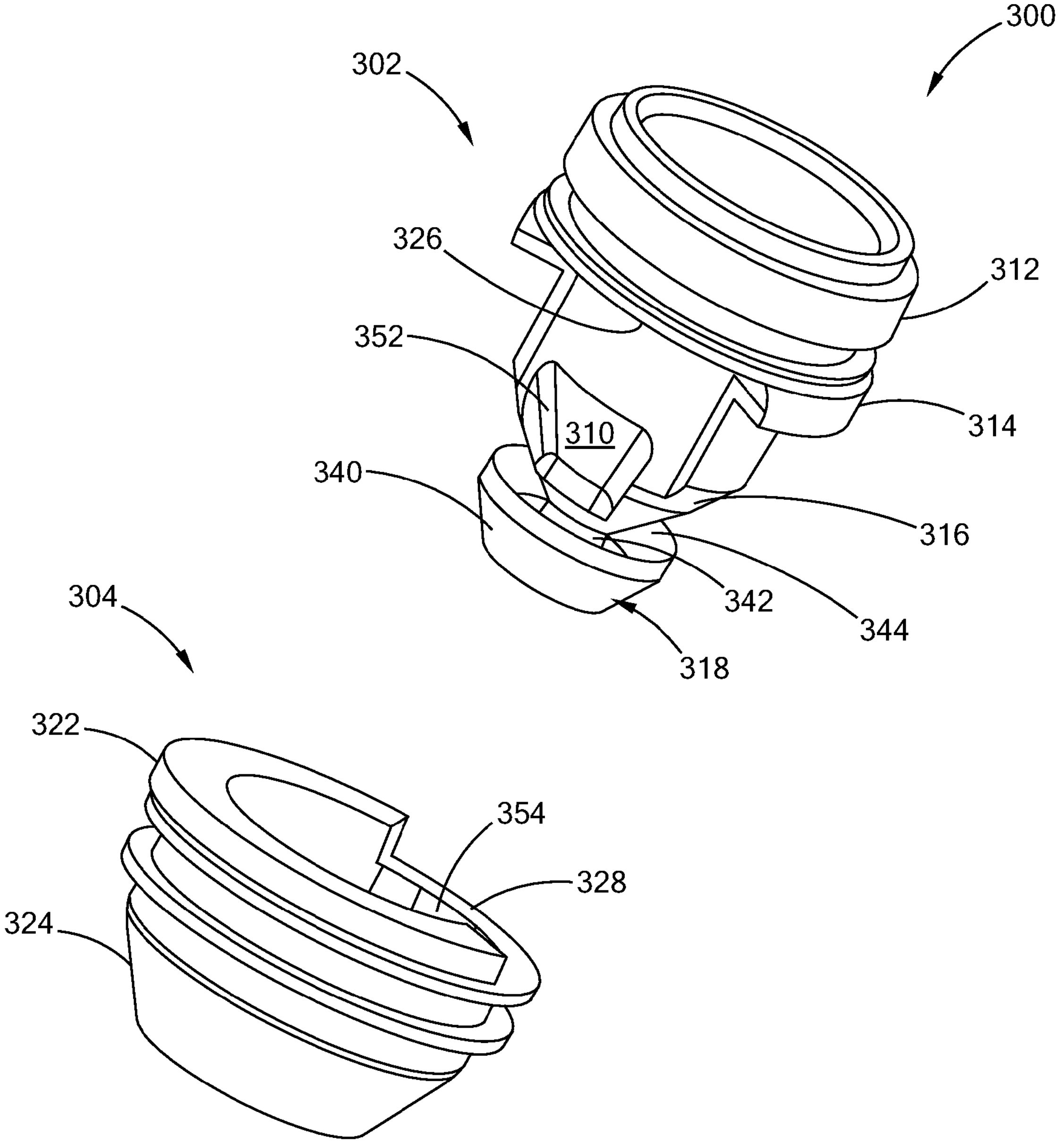
FIG. 18 is an exploded view of the tip of FIG. 17.
Figure 19:
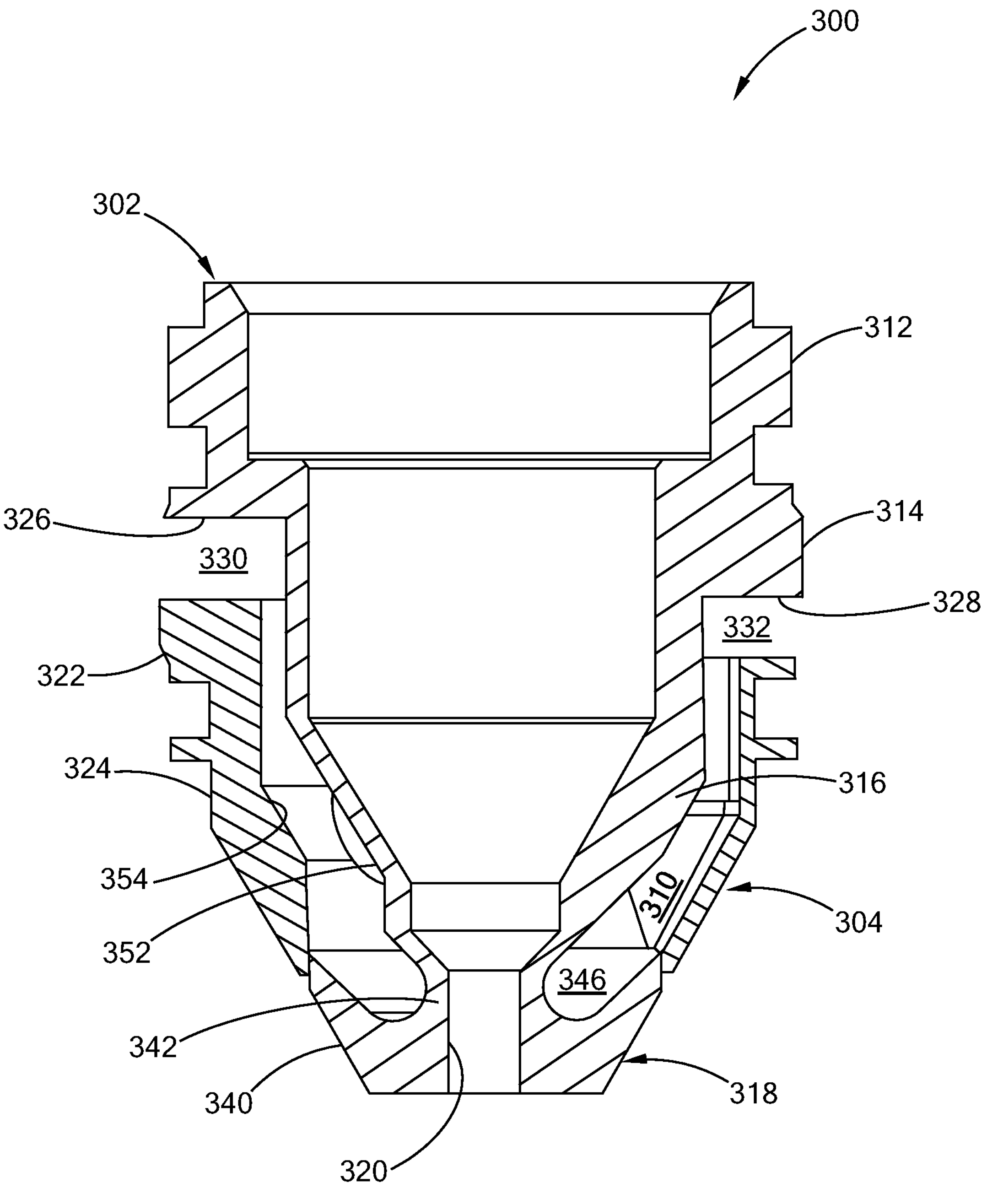
FIG. 19 is a cross-sectional view of the tip, taken along line D-D of FIG. 17.

Referring to FIGS. 17 through 19, an alternate form of the tip 300 is shown to include a central member 302 and an outer member 304. The primary differences between the tip 300 and the tip 102 of FIGS. 14 to 16 reside in the configurations of the fluid passageways and the orifice portion of the central member as described in more detail below.

The central member 302 extends from a proximal portion 306 to a distal portion 308. The outer member 304 is disposed at the distal portion 308 and surrounds the central member 302 to define an internal cavity 310 therebetween. The central member 302 includes a seat portion 312 for receiving a distal portion of the spacer 104, a first annular flange 314, a tapered wall 316, and an orifice portion 318. The orifice portion 318 defines a central orifice 320.

The outer member 304 includes a second annular flange 322 and a tapered wall 324. As shown, instead of defining a plurality of cutouts, the first annular flange 314 defines a single cutout portion 326 and the second annular flange 322 defines a single cutout portion 328. The cutout portions 326 and 328 extend a sufficient length (for example, a quarter of the peripheral length) along the periphery of the flanges 314 and 322. The cutout portion 326 of the first annular flange 314 defines a single fluid passageway 330 with the adjacent second annular flange 322. The cutout portion 328 of the second annular flange 322 defines a second fluid passageway 332 with the adjacent first annular flange 314. The first fluid passageway 330 and the second fluid passageway 332 are in fluid communication with the internal cavity 310. The first fluid passageway 330 allows the cooling fluid to enter and cool the tip 300. The second fluid passageway 332 allows the cooling fluid to exit the tip 300 after cooling.

As clearly shown in FIG. 18, the orifice portion 318 includes a cup body 340 and a protrusion 342 disposed at a center of the cup body 340. The cup body 340 includes a bottom surface 342 and a beveled surface 344 surrounding the bottom surface 342. The bottom surface 342 and the beveled surface 344 form a base portion 346 (FIG. 19) of the internal cavity 310. The tip orifice 320 is defined in the protrusion 342. The cup body 340 provides sufficient space for the cooling fluid to flow around the protrusion 326 to more efficiently cool to the orifice portion 318, which is subjected to most of the heat in the tip 300. Accordingly, the tip 300 can be more efficiently cooled and thus has an improved life.

Similarly, the central member 302 includes an outer peripheral wall section 352. The outer member 304 defines an inner peripheral wall section 354 opposing the outer peripheral wall section 352. The outer peripheral wall section 352 and the inner peripheral wall section 354 are configured to define recesses to form the internal cavity 310 therebetween.

While the orifice portion 262 of the tip 102 of FIGS. 13 through 16 does not include a cup body, it is understood that the orifice portion 262 can be modified to form a cup body for more efficient cooling.

Figure 20:
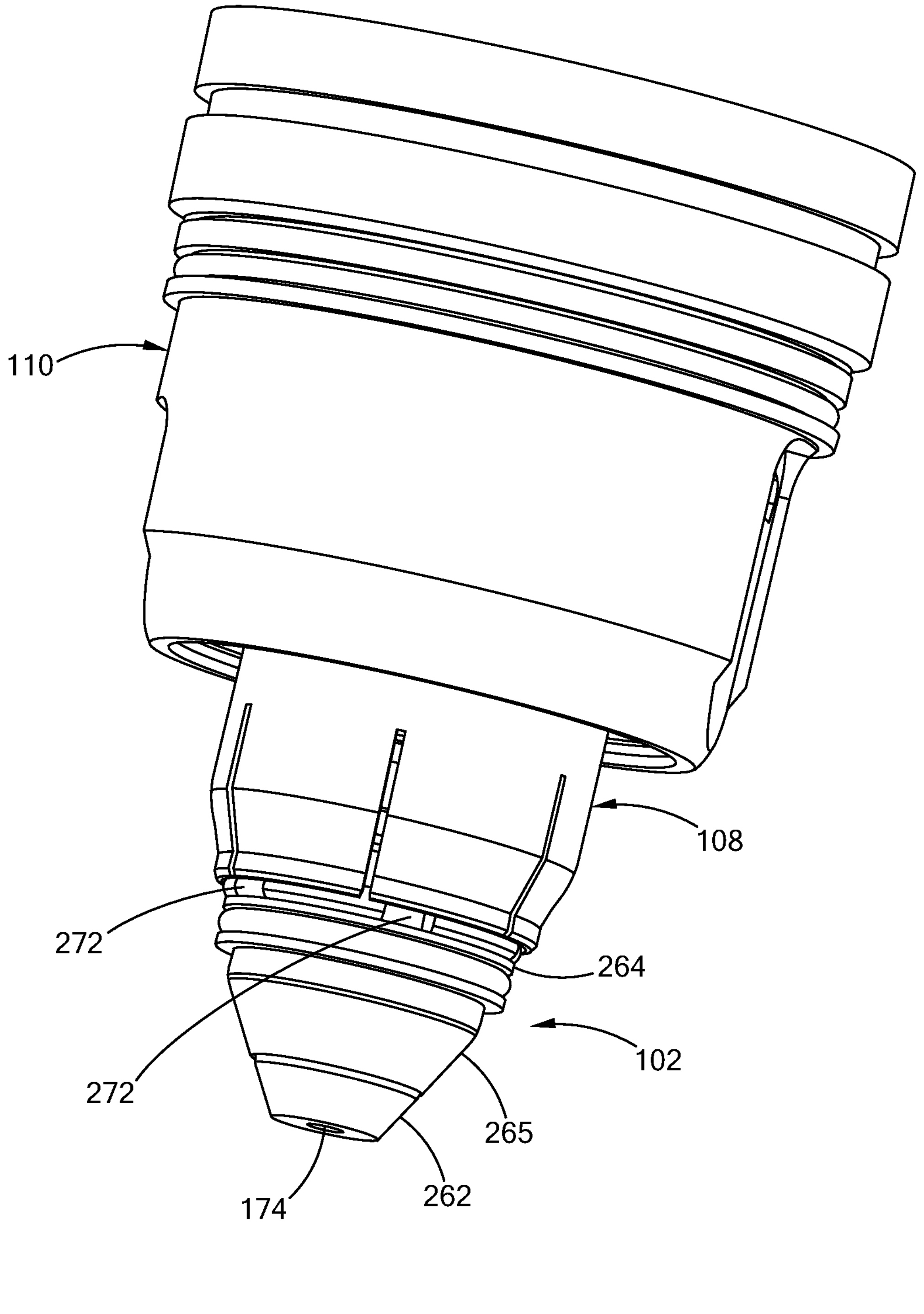
FIG. 20 is a perspective view of a consumable cartridge constructed in accordance with the principles of the present disclosure, wherein the components surrounding the anode member are removed for clarity.

Referring to FIG. 20, the second set of fluid passageways 272 of the tip 102 are exposed from the anode member 108. Accordingly, when the cooling fluid is vented out from the second set of fluid passageways 272, the cooling fluid can flow into the outer fluid passage 148 (shown in FIG. 7) between the anode member 108 and the retaining cap 149, which will be described in more detail below.

Figure 21:
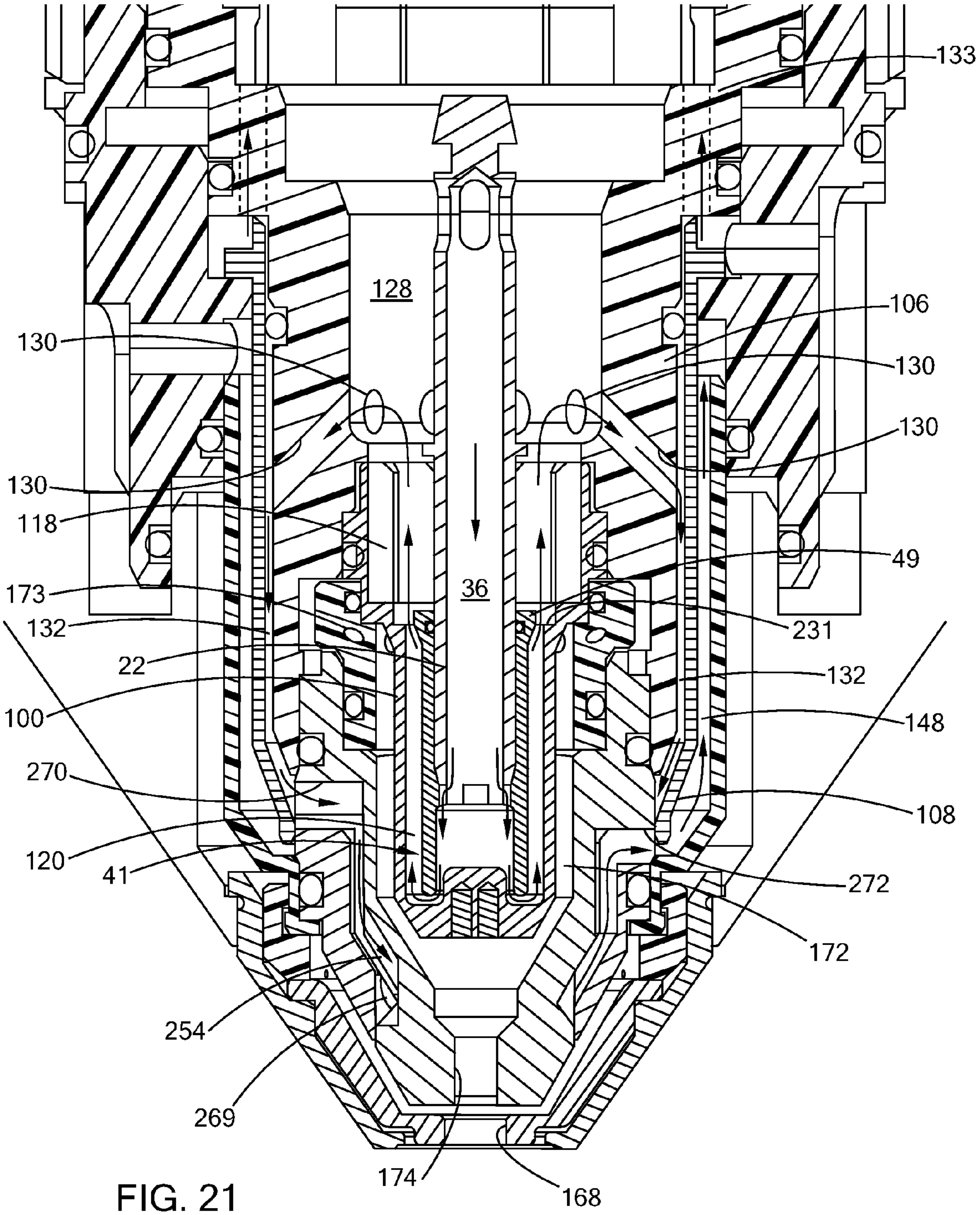
FIG. 21 is an enlarged cross-sectional view of the consumable cartridge showing the direction of the cooling fluid flow.

Referring to FIG. 21, in operation, the cooling fluid flows distally through the central bore 36 of the cathode 22, through the coolant tube assembly 41, and into the distal cavity 120 of the electrode 100. The cooling fluid then flows proximally through the proximal cavity 118 of the electrode 100 to provide cooling to the electrode 100 and the cathode 22 that are operated at relatively high currents and temperatures. The cooling fluid continues to flow proximally to the radial passageways 130 in the cartridge body 106, wherein the cooling fluid then flows through the passageways 130 and into the inner cooling chamber 132 between the cartridge body 106 and the anode member 108. The cooling fluid then flows distally towards the tip 102, which also operates at relatively high temperatures, in order to provide cooling to the tip 102. As the cooling fluid reaches the distal portion of the anode member 108, the cooling fluid enters the internal cavity 254 of the tip 102 through the first set of fluid passageways 270. The cooling fluid reaches the base portion 271 of the internal cavity 254 that is proximate and surrounds the central orifice 174 of the tip 102 to sufficiently cool the tip 102. The cooling fluid then exits the tip 102 through the second set of fluid passageways 270 to the outer fluid passage 148 between the anode member 108 and the retaining cap 149. The cooling fluid reverses direction and flows proximally through the outer fluid passage 148 and then through the outer axial passageways 133 (shown in dashed lines) in the cartridge body 106. The cooling fluid then flows proximally through the anode body 20, enters the coolant return tube 34 and is recirculated for distribution back through the coolant supply tube 30, which has been described in U.S. Pat. No. 6,989,505 and the detail thereof is omitted herein for clarity.

Figure 22:
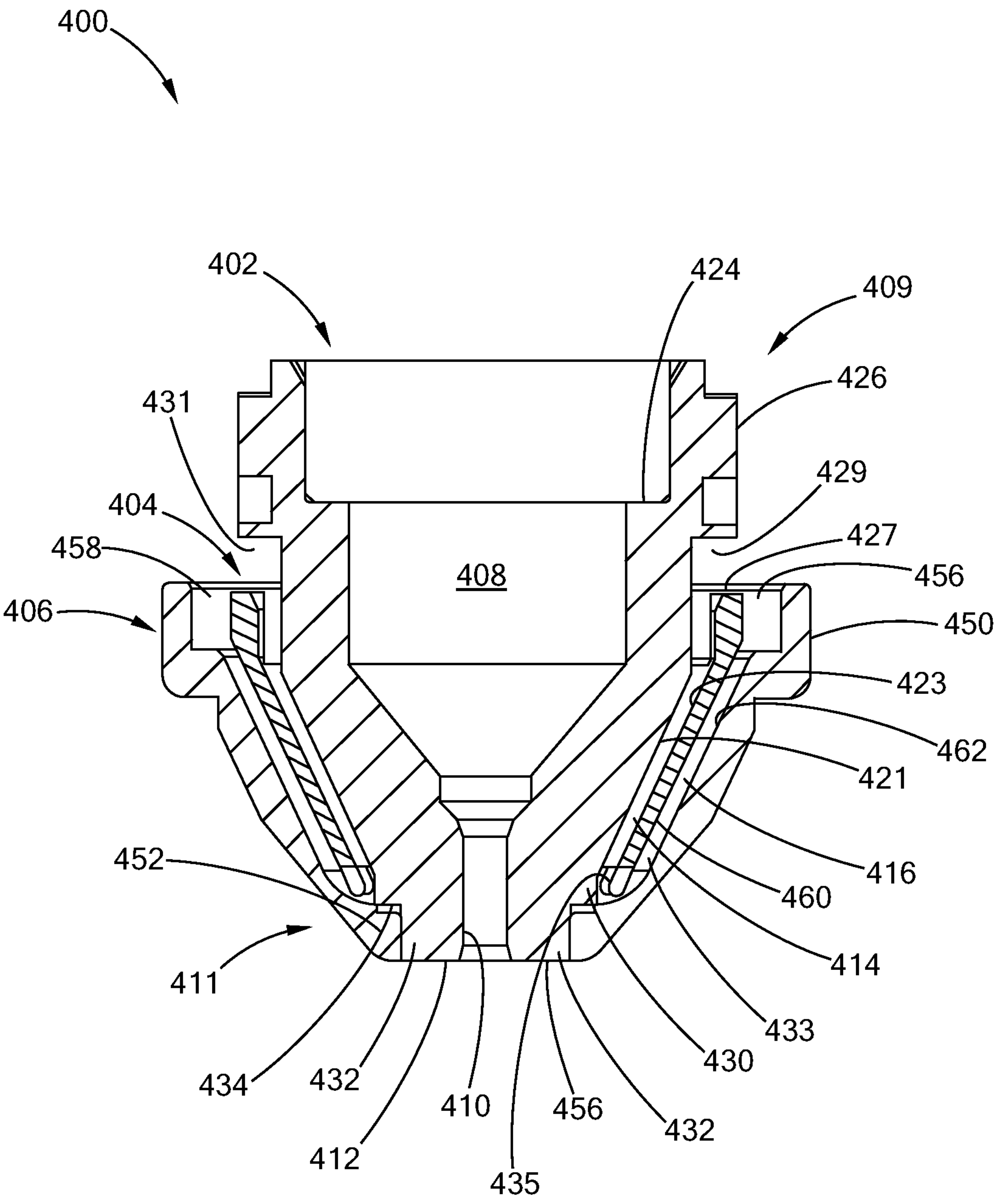
FIG. 22 is a cross-sectional view of a tip in accordance with another form of the present disclosure.

Referring to FIG. 22, an alternative form of the tip 400 is shown to include a three-piece structure: a central member 402, an intermediate member 404 surrounding the central member 402, and an outer member 406 surrounding the intermediate member 404. The tip 400 generally includes a central cavity 408 for receiving the electrode 100 and an exit orifice 410 extending through a distal end face 412. The tip 400 includes a proximal portion 409 and a distal portion 411. The central member 402 extends from the proximal portion 409 to the distal portion 411. The intermediate member 404 and the outer member 406 surround the distal portion 411 of the central member 402. The tip 400 defines a first internal cavity 414 between the central member 402 and the intermediate member 404, and a second internal cavity 416 between the intermediate member 404 and the outer member 406.

Figure 23:
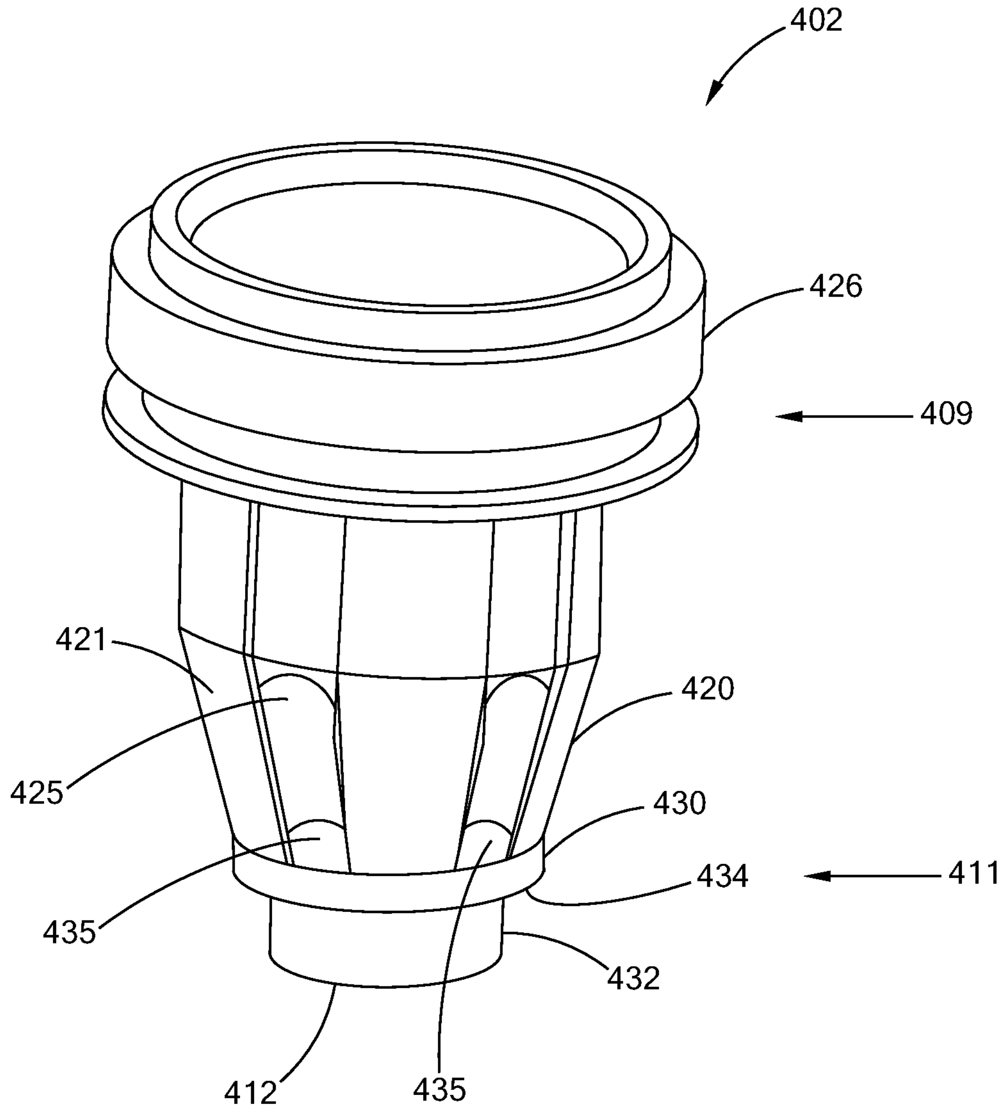
FIG. 23 is a perspective view of a central member of the tip of FIG. 22.

As clearly shown in FIG. 23, the central member 402 has a structure similar to the central member 250 in FIG. 15. More specifically, the distal portion 411 includes a tapered portion 420 connected to the proximal portion 409, a proximal cylindrical portion 430 and a distal cylindrical portion 432. The proximal cylindrical portion 430 is disposed between the tapered portion 420 and the distal cylindrical portion 432. The distal cylindrical portion 432 has an outer diameter smaller than that of the proximal cylindrical portion 430 to define a shoulder 434 therebetween. The shoulder 434 provides positioning and mounting of the outer member 406 to the central member 402.

The proximal portion 409 connects the tip 400 to the cartridge body 106 (shown in FIG. 24) and includes an internal annular ring 424 (shown in FIG. 22) for receiving and abutting against a distal portion of the spacer 104 (shown in FIG. 24) and an external annular ring 426 for abutting against the cartridge body 106. As shown in FIG. 22, the external annular ring 426 is spaced from a proximal end 427 of the intermediate member 404 so as to define at least an inlet passageway 429 and an outlet passageway 431 to allow for entry and exit of the cooling fluid.

As shown in FIG. 23, the tapered portion 420 includes an outer wall section 421 opposing to the inner wall section 423 of the intermediate member 404. The outer wall section 421 may define recesses 425 to form the first internal cavity 414. The first internal cavity 414 has a base portion 435 adjacent to the first cylindrical portion 430.

Referring back to FIG. 22, the outer member 406 surrounds the intermediate body 404 to define the second internal cavity 416. The second internal cavity 416 has a base portion 433 surrounding and adjacent to the exit orifice 410. The outer member 406 includes a proximal portion 450 and a distal inner ring 452 engaging the first cylindrical portion 430 and the second cylindrical portion 432 of the central member 402. The distal inner ring 452 abuts against the shoulder 434 of the central member 402. The distal inner ring 452 has an annular distal face 456 flush with the distal face 412 of the central member 402.

Similarly, the intermediate member 404 includes an outer wall section 460 and the outer member 406 includes an inner wall section 462 opposing the outer wall section 460 to define the second internal cavity 416. The proximal portion 450 of the outer member 406 defines at least one inlet passageway 456 and at least one outlet passageway 458 to allow for entry and exit of the cooling fluid.

The tip 400 of the present embodiment is configured to have a three-piece structure, which defines a first internal cavity 414 and a second internal cavity 416. The internal cavities 414, 416 each have a base portion 435, 433 adjacent to the first cylindrical portion 430 of the central member 402. Therefore, the cooling fluid can flow in the first internal cavity 414 and the second internal cavity 416 and reach the base portions 431 and 433, which surround and are adjacent to the exit orifice 410. Therefore, the tip 400 can be efficiently and effectively cooled by the cooling fluid.

Figure 24:
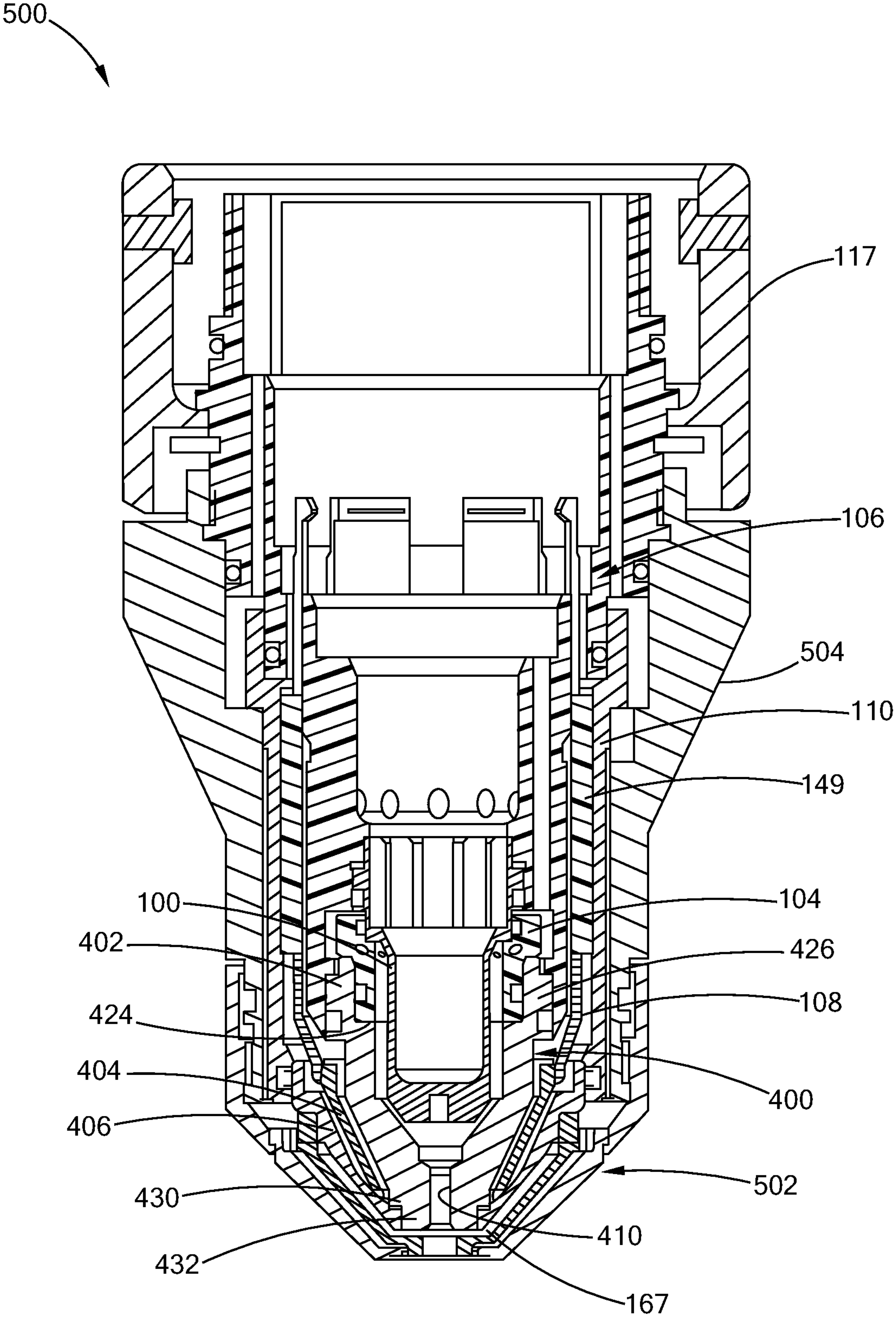
FIG. 24 is a cross-sectional view of a consumable cartridge that includes the tip of FIG. 22.

Referring to FIG. 24, a consumable cartridge 500 that includes the tip 400 is shown to have a structure similar to the consumable cartridge 16 of FIG. 7. Therefore, like components are indicated by like reference numerals and the detailed description thereof is omitted herein for clarify. When the tip 400 is assembled, the internal annular ring 424 of the central member 402 abuts against the spacer 104, and the external annular ring 426 abuts against the inner peripheral surface 460 of the cartridge body 106. The anode member 108 engages the intermediate member 404 to provide electrical continuity from the power supply (not shown) to the tip 400. A secondary cap 502 surrounds the tip 400 to define a secondary chamber 167 therebetween. The secondary cap 502 engages the shield cap 504.

It should be understood that other cooling configurations/circuits may be employed while remaining within the scope of the present disclosure. For example, the tip 102, 300, 400 may have its own direct cooling circuit and not necessarily receive cooling fluid through the electrode first as described in detail above. With the structure of the tip 102, 300 or 400, the cooling fluid enters the internal cavity of the tip 102, 300, or 400 to sufficiently cool the tip 102, 300 or 400 in addition to the cooling by the secondary gas through the secondary gas chamber 167. The internal cavity of the tip 102, 300 or 400 is disposed between the central orifice 174, 320 or 400 and the secondary gas chamber 167 and is closer to the central orifice 174, 320 or 410 to more efficiently cool the tip 102, 300 or 400. Therefore, the life of the tip 102, 300 or 400 is increased. Because the tip 102, 300 or 410 can be efficiently cooled, the tip 102, 300 or 400 can have a smaller central orifice to provide a tighter constriction of the arc, resulting in a plasma arc torch 10 with an improved performance and improved life of consumables.

Advantageously, the coolant tube assembly 41 (which is spring-loaded) is forced upwardly by the electrode 100 near its proximal end portion 224, and more specifically, by the interior face 231 of the electrode 100 as shown in FIGS. 12 and 21 abutting the tubular member 43 at its proximal flange 49, also shown in FIG. 5. With this configuration, the distal end of the coolant tube assembly 41 is not in contact with the electrode 100 and thus more uniform cooling flow is provided around the inserts 222 and the central protrusion 232. Referring to FIG. 14, the external shoulder 230 in an alternate form is squared off with the cylindrical sidewall 238, rather than being tapered as shown in this figure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tip for a plasma arc torch comprising:

a proximal portion adapted for connection to an adjacent anode member, the proximal portion including:

a first annular flange defining a first set of fluid passageways each having a radial inlet extending radially through the first annular flange for entry of a cooling fluid into the tip; and a second annular flange in contact with the first annular flange and defining a second set of fluid passageways each having a radial outlet extending radially through the second annular flange for exit of the cooling fluid from the tip.

2. The tip according to claim 1, further comprising a tapered distal portion extending from the proximal portion to an exit orifice of the tip, the tapered distal portion defining an internal cavity in fluid communication with the first set of fluid passageways and the second set of fluid passageways, wherein the internal cavity is configured to define a base portion that surrounds the exit orifice.

3. The tip according to claim 2, wherein the tip includes a two-piece structure.

4. The tip according to claim 2, wherein the tapered distal portion includes an inner tapered wall extending distally from the proximal portion and an outer tapered wall opposing and surrounding the inner tapered wall, the internal cavity defined between the inner tapered wall and the outer tapered wall.

5. The tip according to claim 4, wherein the tapered distal portion further includes an orifice portion extending distally from the inner tapered wall and defining the exit orifice.

6. The tip according to claim 2, wherein the tapered distal portion further includes an orifice portion including a cup-shaped body and a protrusion disposed at a center of the cup-shaped body.

7. The tip according to claim 1, wherein the first flange defines a plurality of cutout portions to form the first set of fluid passageways and the second flange defines a plurality of cutout portions to form the second set of fluid passageways.

8. The tip according to claim 1, wherein the first set of fluid passageways and the second set of fluid passageways are alternately arranged.

9. The tip according to claim 1, wherein the tip has a three-piece structure and includes a central member, an intermediate member surrounding the central member to define a first internal cavity therebetween, and an outer member surrounding the intermediate member to define a second internal cavity therebetween.

10. The tip according to claim 9, wherein the first internal cavity and the second internal cavity each define a base portion surrounding the exit orifice.

11. A tip for a plasma arc torch, comprising:

a central member adapted for connection to an adjacent anode member, the central member defining a first annular flange, the first annular flange defining an inlet extending radially through the first annular flange for entry of a cooling fluid; and an outer member disposed around the central member and defining a second annular flange in contact with the first annular flange, the second annular flange defining an outlet extending radially through the second annular flange for exit of the cooling fluid.

12. The tip according to claim 11, wherein the central member defines a proximal portion and a tapered distal end portion, the outer member surrounding the tapered distal end portion.

13. The tip according to claim 12, wherein the tapered distal end portion includes an outer peripheral wall section, wherein the outer member defines an inner peripheral wall section and an internal cavity defined between the outer peripheral wall section and the inner peripheral wall section.

14. The tip according to claim 13, the first annular flange defining a first fluid passageway and the second annular flange defining a second fluid passageway, wherein the internal cavity is in fluid communication with the first fluid passageway and the second fluid passageway.

15. The tip according to claim 14, wherein the first flange defines at least one cutout portion to form the first fluid passageway and the second flange defines at least one cutout portion to form the second fluid passageway.

16. The tip according to claim 14, the first and second flanges jointly defining the inlet to the first fluid passageway and the outlet to the second fluid passageway.

17. A plasma arc torch comprising:

a cathode member;

an electrode electrically connected to the cathode member; and a tip surrounding the electrode to define a plasma chamber therebetween, the tip including a central member adapted for connection to an adjacent anode member of the plasma arc torch, the central member comprising:

a proximal portion including a first annular flange defining a radial inlet extending radially through the first annular flange for entry of a cooling fluid into the tip; and a second annular flange in contact with the first annular flange and defining a radial outlet extending radially through the second annular flange for exit of the cooling fluid from the tip.

18. The plasma arc torch of claim 17, the tip further comprising:

an inner peripheral wall section, wherein the outer peripheral wall section of the central member and the inner peripheral wall section of the outer member define an internal cavity in fluid communication with a first fluid passageway and a second fluid passageway; and a base portion of the internal cavity surrounds the exit orifice.

19. The plasma arc torch of claim 18, wherein the first flange defines a plurality of cutout portions to form the first fluid passageway and the second flange defines a plurality of cutout portions to form the second fluid passageway.

20. The plasma arc torch of claim 17, further comprising a cap member surrounding the tip to define a secondary gas chamber between the tip and the cap member, the secondary gas chamber allowing flow of a secondary gas, wherein the internal cavity is disposed between the exit orifice and the secondary gas chamber.

* * * * *